United States Patent [19]

Fujiwara

[11] Patent Number: 5,055,880
[45] Date of Patent: Oct. 8, 1991

[54] COPYING APPARATUS

[75] Inventor: Katsuyoshi Fujiwara, Sennan, Japan

[73] Assignee: Sharp Kabushiki Kaisha, Osaka, Japan

[21] Appl. No.: 469,319

[22] Filed: Jan. 24, 1990

[30] Foreign Application Priority Data

Jan. 28, 1989 [JP] Japan ................................. 1-17874

[51] Int. Cl.⁵ .......................................... G03G 15/28
[52] U.S. Cl. .................................. 355/235; 355/228; 355/232; 355/233; 355/24
[58] Field of Search .............. 355/228, 230, 232, 233, 355/235, 308, 318, 320, 67, 66, 24; 358/296, 300, 400, 401, 408, 413-414, 448, 494, 496-498

[56] References Cited

U.S. PATENT DOCUMENTS

| | | | |
|---|---|---|---|
| 4,422,100 | 12/1983 | DuVall et al. | 358/497 |
| 4,429,333 | 1/1984 | Davis et al. | 358/496 |
| 4,580,172 | 4/1986 | Rajagopal | 355/233 X |
| 4,970,543 | 11/1990 | Ho et al. | 355/320 X |
| 4,980,729 | 12/1990 | Okamoto | 355/320 |

FOREIGN PATENT DOCUMENTS 2128438 5/1984 United Kingdom ............... 355/320

Primary Examiner—A. T. Grimley
Assistant Examiner—Matthew S. Smith

[57] ABSTRACT

A copy apparatus has two exposure modes. In the first mode, the original is fixed and reading is done by a scanning exposure device and in the second mode the exposure device is fixed and the original is moved for reading. The second mode fixed position for the exposure device is the start position for the exposure device in the first mode. In the first mode when reading the originals is performed only once, the exposure device returns immediately to the start position. Alternatively, when reading is plural and continuous, successive scanning is started from the scanning end position which is regarded as the turning position for continuous copying.

7 Claims, 11 Drawing Sheets

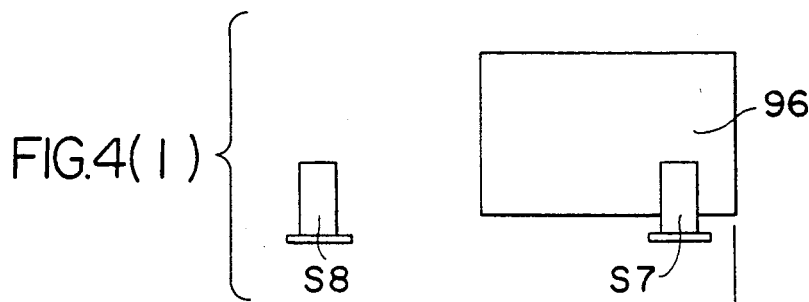
FIG.4(1)
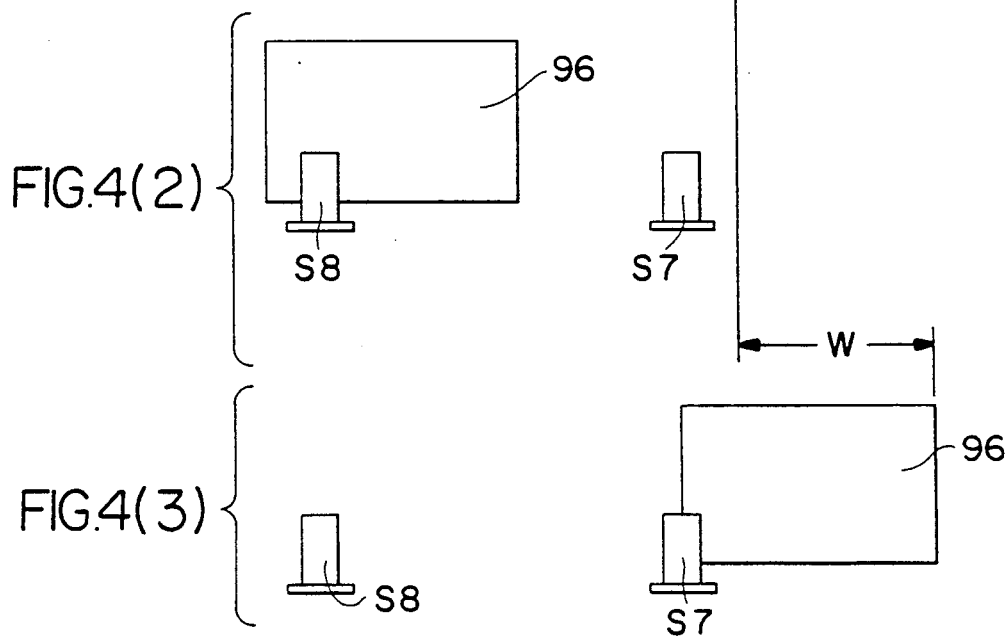
FIG.4(2)
FIG.4(3)
FIG.4(4)

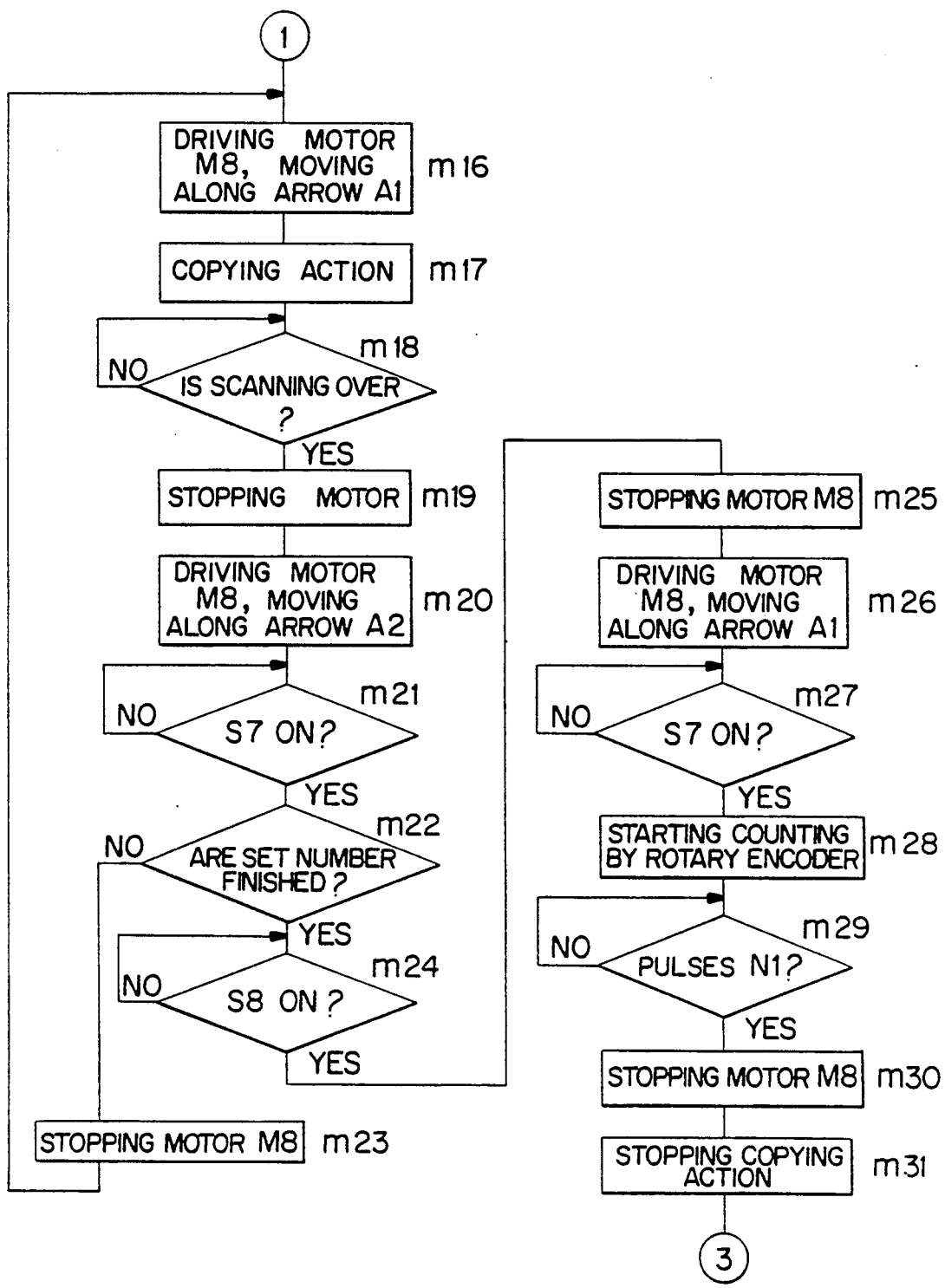
FIG. 7 (2)

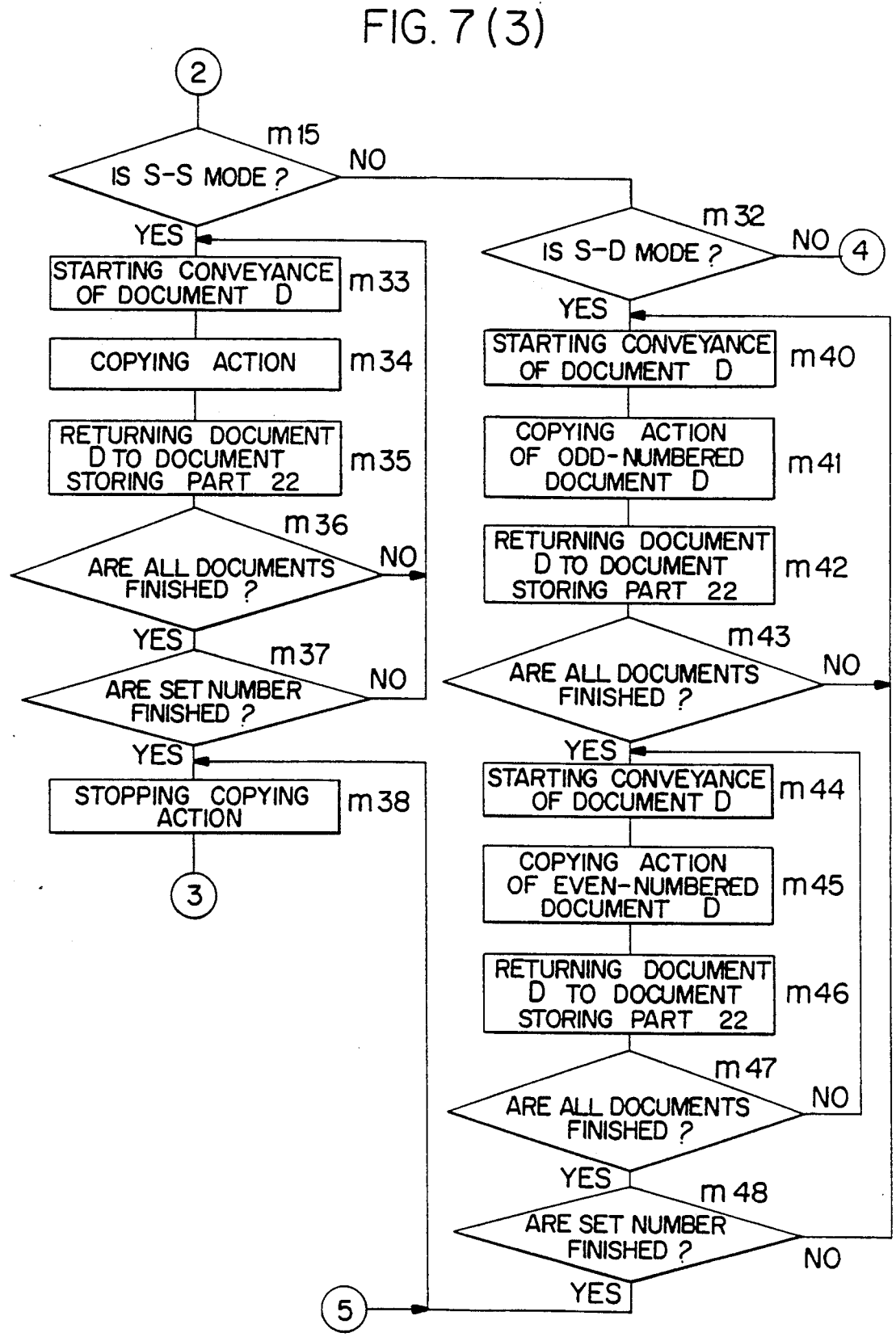

COPYING APPARATUS

BACKGROUND OF THE INVENTION

1. Field of the Invention

The present invention relates to an electrostatic copying apparatus, and more particularly to a copying apparatus possessing a first exposure mode for fixing the original and reading the original image by scanning an exposure means for reading the original image optically, and a second exposure mode for fixing the exposure means and reading the original image by conveying the original to be read by, for example, a recirculating automatic document feeder (RADF).

2. Description of the Prior Art

In an electrostatic copying apparatus, when copying a plurality of documents, the so-called RADF may be installed in order to save the labor of the operator for putting the documents one by one on the original platen. This RADF sequentially conveys the plurality of documents in synchronism with the copying action of the electrostatic copying apparatus main body, and realizes the function of copying duplex documents having the original images to be copied on both sides of copying papers in cooperating with the main body.

The electrostatic copying apparatus having the RADF possesses at least two exposure action modes. That is, in a first exposure mode, the document is placed on the original platen which is a first reading region so that the original image to be copied may confront it, and an exposure means containing an exposure lamp such as a halogen lamp and a reflector mirror disposed at the lower side (the inner side of the electrostatic copying apparatus main body) of the original platen runs at a constant speed, and the original image is read by optical scanning. On the other hand, in a second exposure mode, the documents are conveyed one by one by the RADF, for instance, as being wound around a conveying means of right cylindrical shape, and the exposure means is stopped in a predetermined second reading region near the conveying means, and the original image of the conveyed document is optically scanned and read. The first reading region and the second reading region are disposed at a specific interval on the upper part of the main body.

The light from the exposure lamp of the exposure means is led into the original image to be read of the document, and is selectively absorbed corresponding to the original image. The reflected light from the original image is led into a surface of a photosensitive drum of right cylindrical shape by way of plural reflector mirrors and a zoom lens or the like. In relation to this photosensitive drum, a main corona discharger, a developing device, a transfer corona discharger, and a cleaning device or the like are disposed. The surface of the photosensitive drum is uniformly charged by the main corona discharger, and is selectively destaticized by the light from the exposure means afterwards, and an electrostatic image corresponding to the original image of the document which has been read is formed. This electrostatic image is made sensible into a toner image by the developing device. The toner image is transferred on the copying paper by the function of the transfer corona discharger, and is heated and fixed on the copying paper by a fixing device installed at the downstream side in the conveying direction of the copying paper from the transfer corona discharger. After transfer of the toner image, the toner remaining on the surface of the photosensitive drum is removed by the cleaning device.

In the first exposure mode, the running of the exposure means and the action of the copying process near the photosensitive drum are controlled so as to have a synchronous relationship, and in the second exposure mode, these are controlled so that the conveying action of documents in the RADF and the action of the copying process near the photosensitive drum may have a synchronous relationship. In this way, a favorable copy image may be formed on the copying paper in either mode.

In such electrostatic copying apparatus, the two exposure modes are selected by the operator. Usually, while the copying apparatus is waiting for a selection input of the exposure mode, the exposure means is waiting at the stopping position of the exposure means in the second exposure mode. Afterwards, when the second exposure mode is selected, since the exposure means is already set at the specified stopping position, the copying action in the second exposure mode is started.

When the first exposure mode is selected, on the other hand, the exposure means waiting at the stopping position in the second exposure mode starts to move to the first reading region for the copying action in the first exposure mode. After start of running, the quantity of light of the exposure lamp is raised to the specified level, and the speed is raised to the specified scanning speed just before reaching the first reading region, thereby getting into the first reading region. Later, after the exposure means passes through the first reading region and optically scans the original image of the document to be read, the running direction of the exposure means is inverted, and returns to the stopping position in the second exposure mode. That is, in the first exposure mode, the scanning start position of the exposure means to the first reading region and the scanning end position are both the stopping position of the exposure means in the second exposure mode.

Conventionally, for the document to be read, which is put in the first reading region, the moving range of the exposure means for copying action plural times is not different from the moving range of the exposure means for a single copying action. Therefore, when performing copying action plural times, every time, the running of the exposure means, which starts for scanning from the stopping position in the second exposure mode and returns to the stopping position, is repeated.

In the case of copying plural times, however, when it is designed so that subsequent optical scanning cannot be started unless the exposure means after the optical scanning has returned to the scanning end position which is same as the scanning start position again, it requires a very long time to start second optical scanning in succession after end of first optical scanning, and the copying operation speed cannot be decreased. In particular, when the interval between the scanning start position (scanning end position) and the first reading region for placing the document is relatively wide, a longer time is required.

SUMMARY OF THE INVENTION

It is hence a primary object of the invention to present a copying apparatus capable of outstanding shortening the time required for copying action in a simple structure.

In order to achieve the above object, the invention presents a copying apparatus comprising:

a transparent plate on which a document to be copied is placed, for forming a first reading region, a document feeding means, which is disposed adjacently to the transparent plate deviated in the horizontal direction, for moving the document to a predetermined second reading region, an optical reading means for running reciprocally in the first reading region, stopping at a predetermined stopping position in the second reading region, and possessing a moving portion for moving so as to read the document optically, a driving means for moving the moving portion, which stops and holds at the stopping position when reading in the second reading region, moves from the stopping position when reading in the first reading region, reciprocates in the first reading region when reading once in the first reading region and returns to the stopping position after scanning, reciprocates in the first reading region when reading plural times in the first reading region and, after scanning, moves to a turning position for continuous copying predetermined between the first reading region and the stopping position, and repeatedly reciprocates in the first reading region from the turning position for continuous copying, and returns to the stopping position after reading plural times, and a copying means for copying the original image on a copying paper in response to the output from the optical reading means.

In a preferred embodiment, the turning position for continuous copying is detected by an optical detecting means comprising a light emitting element and a light receiving element, and the driving means moves the moving portion in response to the output from the optical detecting means.

In other preferred embodiment, the moving portion comprises a light source for emitting light to the document, and a distance from the turning position for continuous copying to the first reading region is set corresponding to time necessary for the quantity of light of the electrically energized light source to rise up from the turning position for continuous copying.

In a further preferred embodiment, the distance from the turning position for continuous copying to the first reading region is set corresponding to time necessary for rising up to a running speed in the first reading region of the moving portion from the turning position for continuous copying.

Moreover, in order to achieve the object, the invention presents a copying apparatus comprising:

a transparent plate on which a document to be copied is placed, for forming a first reading region, a document feeding means, which is disposed adjacently to the transparent plate deviated in the horizontal direction, for moving the document to a predetermined second reading region, an optical reading means for running reciprocally in the first reading region, stopping at a predetermined stopping position in the second reading region, and possessing a moving portion so as to read the document optically, a driving means for moving the moving portion which moves to a predetermined running start position between the stopping position and the first reading region from the stopping position when running in the first reading region, scans reciprocally in the first reading region from the running start position depending on the number of times of copying, and returns to the stopping position after finishing copying, and a copying means for copying the original image on a copying paper in response to the output from the optical reading means.

In a preferred embodiment, the second reading region is formed in a pair being deviated in the horizontal direction, the document feeding means runs the document so that the one surface faces the one second reading region and the other surface faces the other second reading region, and the driving means stops the moving portion at the stopping position opposite to the one second reading region when scanning the one surface of the document by the document feeding means, and moves and stops the moving portion at other stopping position opposite to the other second reading region when scanning the other surface of the document.

Still more, to achieve the object, the invention presents a copying apparatus for reading an original image by optical scanning, wherein a first reading region where the document is fixed, and the original image is read by scanning with an exposure means for reading optically, and a second reading region where the exposure means is fixed, and the document to be read is scanned by running are determined, a fixing position of the exposure means corresponding to the second reading region is selected at a scanning start position of the exposure means to the first reading region, and a scanning end position finishing the scanning in the first reading region by the exposure means is selected somewhere between the scanning start position of the exposure means and the first reading region.

According to the invention, the copying apparatus for reading the original image by scanning optically determines the first reading region in which the document is fixed, and the original image is read by scanning the exposure means as the moving portion of the optical reading means for reading the original image optically by the driving means, and the second reading region in which the exposure means is fixed, and the document to be read is scanned by running. The fixing position of the exposure means corresponding to the second reading region is the scanning start position to the first reading region of the exposure means for optically scanning the original image of the document fixed in the first reading region. The scanning end position where it is judged that scanning by the exposure means which has scanned optically on the first reading region is finished is the turning position for continuous copying, and it is selected somewhere between the scanning start position of the exposure means and the first reading region. The scanning end position is detected by optical detecting means, and the running of the exposure means by the driving means is controlled. Also the scanning end position is set corresponding to the rise speed of the quantity of light from the light source forming the exposure means, or the rise speed up to the running speed in the first reading region of the exposure means. The original image optically read by the exposure means is formed by the copying means, and is copied on the copying paper.

Therefore, according to the invention, since the scanning end position of the exposure means which has finished the scanning in the first reading region is selected somewhere between the scanning start position to start scanning of the exposure means to the first reading region and the first reading region, when optically scanning the original image in the first reading region continuously plural times, the exposure means which has finished the first optical scanning is not required to return to the scanning start position, but immediately second and third optical scanning may be started from the scanning end position selected as specified herein, so that the time required for scanning may be outstandingly shortened. In other words, the time required for plural times of copying action may be shortened notably, and the grade of the copying apparatus may be superbly enhanced

BRIEF DESCRIPTION OF THE DRAWINGS

These and other objects of the invention, as well as the features and advantages thereof, will be better understood and appreciated from the following detailed description taken in conjunction with the drawings, in which:

FIG. 4 is a configuration drawing of the linking piece 96 and the home position detecting elements S7, S8.

DETAILED DESCRIPTION OF THE PREFERRED EMBODIMENTS

Figure 1:
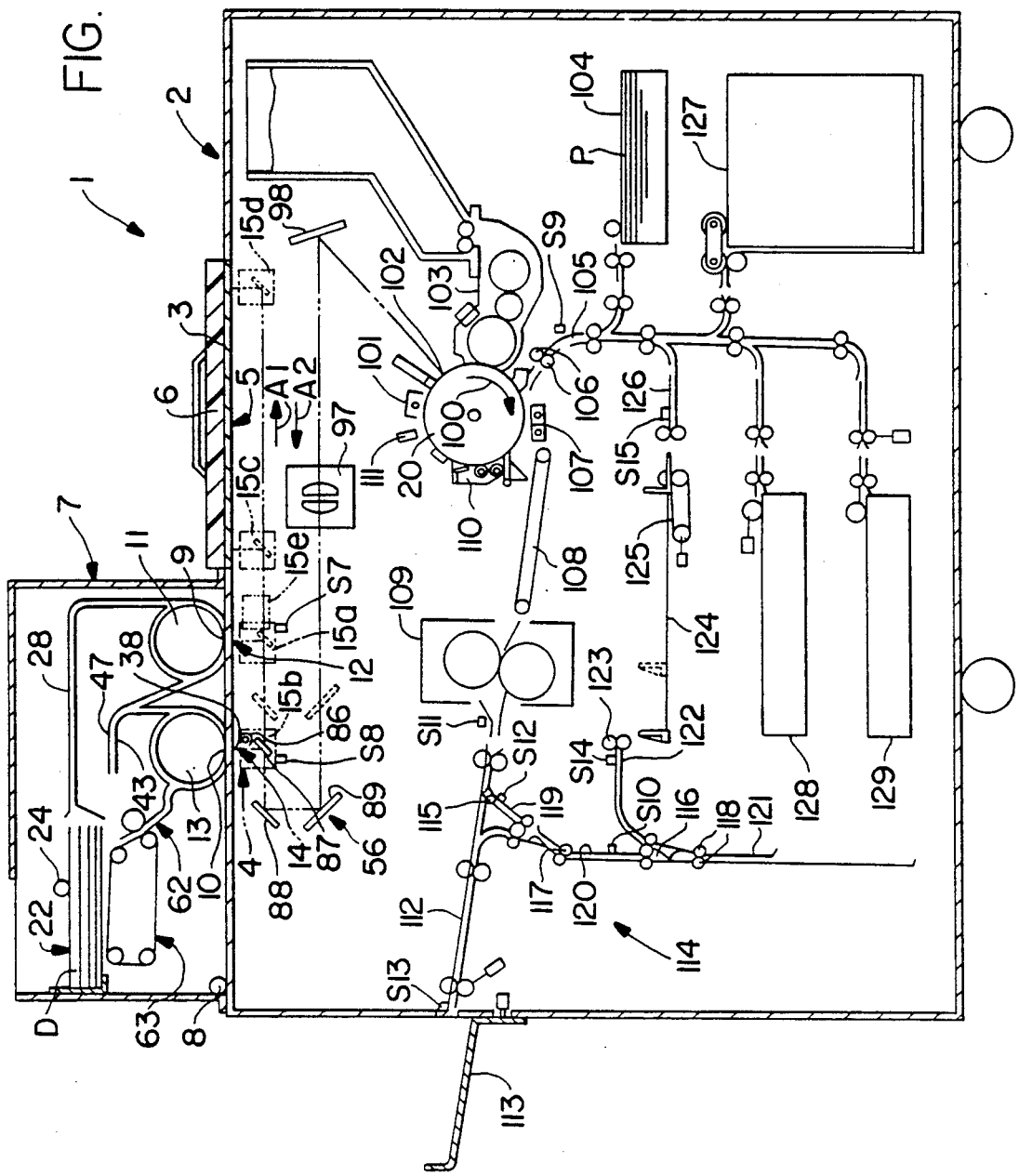
FIG. 1 is a sectional view showing a simplified structure of an electrostatic copying apparatus 1 as one of the embodiments of the invention.

Referring now to the drawings, one of the preferred embodiments of the invention is described in detail below FIG. 1 is a sectional view showing a simplified structure of a transfer type electrostatic copying apparatus 1 as one of the embodiments of the invention. In the upper part of a main body 2 of the transfer type electrostatic copying apparatus 1, a first transparent plate 3 made of hard glass or the like is disposed. This transparent plate 3 is an original platen on which a bulky set of documents such as a book is placed, and the original image of the document to be read is set opposite to the inner side of the main body 2, and a first reading region for optical scanning by a exposure means 4 which is a moving portion of an optical reading means as stated below is provided. Above the first transparent plate 3 there is disposed a pressure plate 6 in a rotatable manner for pressing down the documents and covering the original image of the placed documents from the incoming light or the like.

At a position above the main body 2 and near the pressure plate 6, an RADF 7 for feeding the sheet originals sequentially in order to convey the sheet originals to a reading region one by one for reading and exposing is rotatably installed about a rotary shaft 8 with respect to the main body 2 of the copying apparatus 1.

On the same flat plane as the first transparent plate 6 above the main body 2, a second transparent plate 9 and a third transparent plate 10 are disposed. The second transparent plate 9 is located beneath a first support tube 11 in a right cylindrical form as means for conveying documents installed in the RADF 7 as stated below. Elements 12 and 14 define a first and second reading portion of a second reading region. The main body inner side of the second transparent plate 9 corresponds to a first portion 12 of a second reading region for reading one surface of the document conveyed into the first support tube 11, having the exposure means 4 disposed nearby. The third transparent plate 10 is similarly located beneath a second support tube 13 in a right cylindrical form as the conveying means in the RADF 7. The main body inner side of the third transparent plate 10 corresponds to a second reading portion 14 of a second reading region for reading the other surface of the document conveyed into the second support tube 13, having the exposure means 4 disposed nearby.

The copying action of the copying apparatus 1 is selected by the operator as described below, and a first exposure mode of putting the original on the first transparent plate 3 as the original platen, running and scanning the exposure means 4, and reading the original image optically, or a second exposure mode of setting the exposure means 4 in either one of the reading portions 12, 14, and optically reading the original image of the document conveyed by the support tubes 11, 13, by using the RADF is selected.

Figure 2:
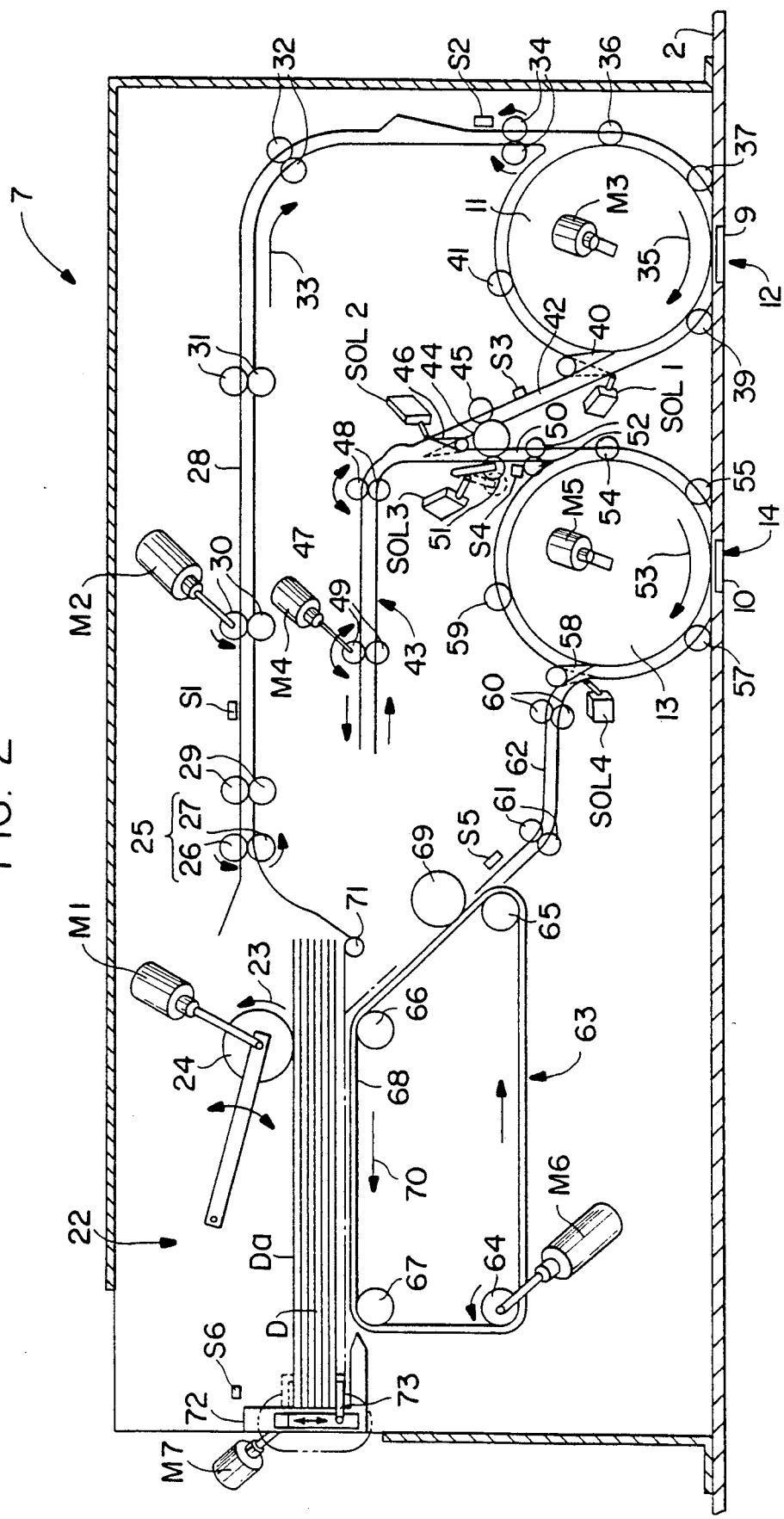
FIG. 2 is a sectional view showing a simplified structure of the RADF 7.

FIG. 2 is a sectional view showing a simplified structure of the RADF 7. Referring to FIG. 2, the conveying action of the sheet document D in the RADF 7 is explained below.

To copy the sheet documents D, the documents D are stacked up in a document storing part 22 in the RADF 7. The documents D stacked up in the document storing part 22 are fed one by one from the uppermost document Da by a paper feed roller 24 rotated and driven in the direction of arrow 23 by a motor M1, and are led into a handling roller 25. The fed documents D are conveyed into a conveying route 28 securely one by one by cooperation with an upper roller 26 and a lower roller 27 rotating in same direction as the handling roller 25.

In the conveying route 28, there are four pairs of conveying rollers 29 to 32. As a motor M2 rotates and drives, for example, the conveying roller 30, the other three pairs of conveying rollers 29, 31, 32 are also rotated and driven in cooperation. By the rotation of the conveying rollers 29 to 32, the document D is conveyed in the direction of arrow 33. In the conveying route 28, moreover, detecting elements S1, S2 for detecting the conveying position of the document D are disposed, for example, by means of optical detecting elements.

At the exit of the conveying route 28, near the first support tube 11, a pair of resist rollers 34 are provided. In these resist rollers 34, a power transmitting means is coupled to a drive shaft which is not shown, by way of a clutch CLT1, and by the on/off control of the clutch CLT1, the rotation/stopping of the resist rollers 34 is controlled. By the driving control of the resist rollers 34, the timing for conveying the document D to the first support tube 11 is controlled. This control of conveying timing of document D is effected in synchronism with the control of timing of conveying a copying paper P into a photosensitive drum 20 in the main body 2. Therefore, as stated below, after the read original image of the document D is exposed on the photosensitive drum 20, the timing of transferring a toner image made sensible from the original image onto the copying paper P may be controlled.

In the first support tube 11, suction holes are formed, for example, in the outer circumferential surface, and a suction means which is not shown is connected inside the first support tube 11. By the suction force of this suction means, the conveyed document D is supported tightly around the first support tube 11. The first support tube 11 is rotated and driven by a motor M3 in the direction of arrow 35, and the document D tightly supported around the first support tube 11 is pinched between the first support tube 11 and driven rollers 36, 37, and passes over the second transparent plate 9 provided in the first reading portion 12.

To read one surface of the passing document D, the exposure means 4 comprising an exposure lamp 38 such as halogen lamp (see FIG. 1) and reflector mirrors is set at a first position 15a (see FIG. 1) at the inner side of the main body of the second transparent plate 9. Light is emitted from the exposure lamp 38 of the exposure means 4 to one surface of the document D faced to the second transparent plate 9 (the upper side of the document D stacked up in the document storing part 22 in FIG. 2), and reading and exposing action is carried out. While the document D passes over the second transparent plate 9, when the exposure means 4 is not located at the first position 14a, the reading and exposing action is not done, and the document D only passes through.

The document D whereof one surface has been read on the second transparent plate 9 is pinched between the first support tube 11 and a driven roller 39, and passes a direction turning pawl 40. When the position of the direction turning pawl 40 comes to the position indicated by virtual line in FIG. 2, the document D is pinched between the first support tube 11 and a driven roller 41, and passes again over the second transparent plate 9, and the reading and exposing action is effected. When the direction turning pawl 40 is changed over to the position indicated by solid line in FIG. 2, the document D is conveyed into a document inverting means 43 through a conveying route 42. The changeover of the direction turning pawl 40 is controlled by the operation of a solenoid SOL1.

The document inverting means 43 comprises a detecting element S3, a pair of conveying rollers 44, 45, a direction turning pawl 46, a conveying route 47, and two pairs of conveying rollers 48, 49 rotatable both normally and reversely. The document D coming up to the conveying route 42 is conveyed into the conveying route 47 in the document inverting means 43 by means of the conveying rollers 44, 45, 48, 49. While the document D is being conveyed into the conveying route 47, the direction inverting pawl 46 is set at the position indicated by virtual line in FIG. 2. When the upstream end in the conveying direction of the document D conveyed in the conveying route 42 passes the detecting element S3, the action to invert the indicating direction of the surface of the document D is started, for example, after a preset time. That is, the conveying rollers 48, 49 are driven and rotated by a motor M4 in a direction of returning the document D to the position where the direction turning pawl 46 is disposed, and the direction turning pawl 46 is changed over to the position indicated by solid line in FIG. 2. Therefore, the document D passes the position of the direction turning pawl 46, and is conveyed into a conveying route 50. The changeover of the direction turning pawl 46 is controlled by the operation of a solenoid SOL2.

The document D conveyed into the conveying route 50 is pinched by the conveying roller 44 and a conveying roller 51 which rotates following the rotation of the conveying roller 44 while abutting against/departing from the conveying roller 44, and is conveyed into the second support tube 13. The abutting against/departing from the conveying roller 44 of the conveying roller 51 is controlled by the operation of a solenoid SOL3. When the downstream end in the conveying direction of the document D which has been passed through the conveying rollers 44, 51 is detected by a detecting element S4, a pair of resist rollers 52 is controlled by similar means as the resist rollers 34, so that the document D is conveyed into the second support tube 13. In the resist rollers 52, a power transmitting means is coupled to a drive shaft which is not shown, by way of a clutch CLT2, and by the on/off control of the clutch CLT2, the rotation/stopping of the resist rollers 52 is controlled.

The second support tube 13 is structured same as the first support tube 11, and tightly supports the conveyed document D by the suction force such as the suction means as stated above. The second support tube 13 is rotated and driven by a motor M5 in the direction of arrow 53, and the document D tightly supported around the second support tube 13 is pinched between the second support tube 13 and driven rollers 54, 55, and passes over the third transparent plate 10 disposed in the second reading portion 14 of the second reading region. As the document presenting side is inverted by the document inverting means 43, the surface of the document D faced to the third transparent plate 10 is the other surface that has not been read yet (in FIG. 2, the lower side of the document D stacked up in the document storing part 22). To read this other surface, an optical system 56 (see FIG. 1) including the exposure means 4 is moved, and the exposure means 4 is set at a second position 15b (see FIG. 1) at the inner side of the main body of the third transparent plate 10. From the exposure lamp 38 of the exposure means 4, light is emitted to the other surface of the document D faced to the third transparent plate 10, and reading and exposing action is effected. When the exposure means 4 is not located at the second position 15b, the reading and exposing action is not done even when the document D is conveyed on the third transparent plate 10, and it merely passes through.

The document D whereof the other surface has been read on the third transparent plate 10 is pinched between the second support tube 13 and a driven roller 57, and is conveyed into the position of a direction turning pawl 58. When the direction turning pawl 58 is set at the position indicated by virtual line in FIG. 2, the document D is pinched between the second support tube 13 and a driven roller 59 and conveyed, and it passes again over the third transparent plate 10, and the reading and exposing action is carried out. When the direction turning pawl 58 is changed over to the position indicated by solid line in FIG. 2, the document D is conveyed into a conveying route 62, and is further sent into a document restoring means 63 by two pairs of conveying rollers 60, 61. This direction turning pawl 58 is controlled by the operation of a solenoid SOL4.

The document restoring means 63 comprises a main roller 64, three driven rollers 65 to 67, an endless belt 68 for restoring the document being stretched over these four rollers, and a driven roller 69 for conveying the document D by pinching with the belt 68. Near the exit of the conveying route 62, a detecting element S5 for detecting the downstream end in the conveying direction of the conveyed document D is provided, and a motor M6 is energized/de-energized in response to the output from this detecting element S5. That is, when the downstream end in the conveying direction of the document D conveyed in the conveying route 62 is detected by the detecting element S5, the main roller 64 is rotated and driven by the motor M6, and conveying of the belt 68 for restoring the document in the direction of arrow 70 is started. The document D is conveyed as being pinched between the belt 68 and the driven roller 69 which rotates following up the belt 68, and is inserted and restored in the lowermost part of the documents D stacked up in the document storing part 22.

At the lower side near the entrance of the conveying route 28 of documents D, a document rear end kick roller 71 is disposed to kick up the lower side of the rear end portion of the document, and the opening for restoring the document D in the lowermost part is securely widened. When the downstream end in the conveying direction of Document D conveyed by the belt 68 reaches, for example, a side aligning member 72, the motor M6 is stopped.

The document storing part 22 comprises an actuating member 73 to detect the end of one circulation of all stored documents D into the conveying routes. This actuating member 73 is located at the lowest position indicated by solid line in FIG. 2 before the documents D are stored into the document storing part 22 to be copied, and the documents to be copied are stacked up and placed thereon. The documents D after presenting each original surface in the first reading portion 12 and the second reading portion 14 are sequentially inserted into the lower side of the actuating member 73 by the document restoring means, and the actuating means 73 goes up gradually. Therefore, when one circulation of all documents D is over, the actuating member 73 reaches the highest position indicated by virtual line in FIG. 2.

When the actuating member 73 reaches the highest position, it is detected by a detecting element S6. As the actuating member 73 reaches the highest position, a motor M7 for driving the actuating member is energized, and the actuating member 73 is rotated 360 degrees to be moved to the lowest position (solid line in FIG. 2) of the stored documents D, and is set again. By one cycle of the actuating member 73, end of first reading and exposing action of all documents D, that is, end of copying action of one whole set is judged, and a control signal for copying action of a desired number of sets is issued.

The optical system 56 comprises the exposure means 4 composed of the exposure lamp 38 and reflector mirrors 86, 87, reflector mirrors 88, 89, a zoom lens 97, and a reflector mirror 98. When the exposure means 4 is disposed at each position mentioned below, and the reading and exposing action is done, the reflected light from the original image is focused in a focusing region 102 on the photosensitive drum 20 stated below through the optical system 56.

As mentioned above in the second exposure mode using the RADF 7, when effecting the reading and exposing action in the first reading portion 12, the exposure means 4 is set in the first position 15a, and when reading and exposing in the third reading region 14, the exposure means 4 is set in the second position 15b. On the other hand, in the first exposure mode in which the reading and exposing action is done in the first reading region 5, the exposure means 4 runs at a specific speed over the document placed on the first transparent plate 3, in the direction of arrow A1 from a third position 15c to a fourth position 15d as shown in FIG. 1, and the original image is read and exposed by the light from the exposure lamp 38 of the exposure means 4.

While the copying apparatus 1 is stopped or the copying apparatus 1 is waiting for selection of the two kind of modes by the operator, the exposure means 4 is set, for example, in the first position 15a. When the second exposure mode is selected as the copying action, the exposure means 4 is moved to the position 15a or 15b near either reading region in which the reading and exposing action is done, in synchronism with the conveying of the documents D into each reading region in the RADF 7 mentioned above. In other words, when reading and exposing the document conveyed into the first reading portion 12, the exposure means 4 is set in the first position 15a, and when reading and exposing the document conveyed into the second reading portion 14, the exposure means 4 is set in the second position 15b.

On the other hand, when the copying action of the first exposure mode is selected by the operator, the exposure means 4 waiting at the first position 15a begins to move to the moving direction indicated by arrow A1 along with the copy start switch on the operation panel described below. That is, the first position 15a is a scanning start position in the first exposure mode. The exposure means 4 starting to move in the direction of arrow A1 sufficiently starts up the quantity of light of the exposure lamp 38 and further increases up to the scanning speed during reading and exposing action until it reaches the third position 15c for starting the reading and exposing the document put on the first transparent plate 3, and gets into the first reading region 5. Afterwards, when the exposure means 4 moves up to the fourth position 15d, the exposure means 4 stops temporarily, and then starts to move in the running direction indicated by arrow A2 in succession. At this time, the exposure lamp 38 is extinguished, and the exposure means 4 returns to a fifth position 15e set somewhere between the third position 15c and the first position 15a.

When finishing by copying only once the document placed on the first transparent plate 3, the exposure means 4 returning to the fifth position 15e as stated above continues to move in the direction of arrow A2, and stops at the first position 15a, thereby finishing the copying action. On the other hand, when repeating the copying action plural times for the placed document (that is, same copying is repeated plural times), the exposure means 4 moving up to the fifth position 15e stops temporarily, and starts to move in the direction of arrow A1 in succession from the fifth position 15e, and subsequent reading and exposing action is started. That is, the fifth position 15e may be considered as a scanning end position of the move of the exposure means 4 in the single reading and exposing action in the first exposure mode, and it may be also assumed as a turning position for continuous copying as the judging position of termination/continuation when reading and exposing action is repeated plural times. The interval between the fifth position 15e and the third position 13c is properly selected so that the quantity of light of the exposure lamp 38 is sufficiently rised up and the running speed is sufficient for running the first reading region 5 when the exposure means 4 at least reaches the third position 15c.

Figure 3:
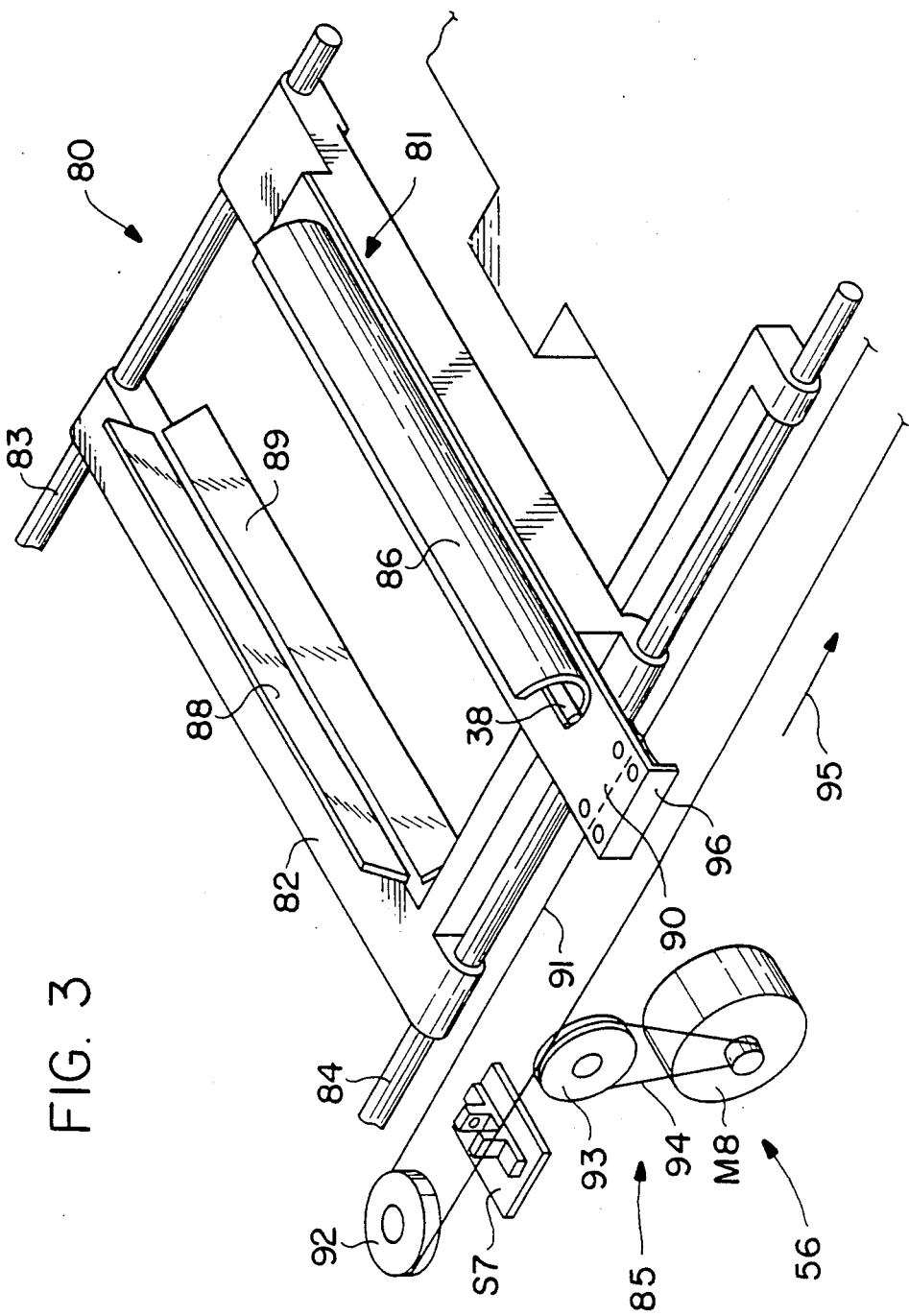
FIG. 3 is a perspective view of essential parts of the optical system 56.

The structure for controlling the move of the exposure means 4 is described below. FIG. 3 is a perspective view of essential parts of the optical system 56. A moving means 80 comprises a first moving piece 81, a second moving piece 82, a pair of guide bars 83, 84 for supporting these moving pieces 81, 82, and a move transmitting part 85 for moving the moving pieces 81, 82. In the moving pieces 81, 82 which make up a pair, the exposure lamp 38 and reflector mirrors 86, 87 are supported on the first moving piece 81. Mirror 87 is not shown in FIG. 3, but is shown in FIG. 1. The reflector mirrors 88, 89 are supported on the second moving piece 82. At both sides of the moving pieces 81, 82, insertion holes are formed, and the guide bars 83, 84 are mutually inserted into the insertion holes. Therefore, the moving pieces 81, 82 are free to slide in the lengthwise direction of the guide bars 83, 84.

At the side of the first moving piece 81, a wire fixing piece 90 is provided, and one portion of a wire 91 is fixed. The wire 91 is stretched between a pulley 92 and another pulley which is not shown, and this wire 91 is wound on a pulley 93. A wire 94 is stretched between the pulley 93 and a rotary shaft of a DC motor M8. Therefore, normal and reverse rotating torque of the DC motor M8 is transmitted to the pulley 93, and the wire 91 is moved in the direction of arrow 95 and its reverse direction, so that the first moving piece 81 moves in the horizontal direction, while the second moving piece 82 moves at a speed of ½ of the first moving piece 81.

At the side of the wire fixing piece 90 of the first moving piece 81, a linking piece 96 is provided. At the lower part of the first position 15a of the exposure means 4 shown in FIG. 1, a home position detecting element S7 composed of photo interruptor or the like is disposed. When the linking piece 96 approaches the detecting element S7 and the light in the photo interruptor is cut off, the processing circuit built in the main body 2 judges the signal from the detecting element S7, and controls the move/stop of rotation of the DC motor M8 as mentioned below, thereby controlling the move of the moving pieces 81, 82.

In the lower part of the second position 15b of the exposure means 4, also, a detecting element S8 similar to the detecting element S7 is disposed, and when the linking piece 96 shields the light, a signal necessary for controlling the move of the first moving piece 81 and the second moving piece 82 is issued. Furthermore, although not shown in the drawing, detecting elements similar to the detecting element S7 are disposed in the lower parts of the third position 15c and fourth position 15d as both ends of the first reading region 5, and signals necessary for start and end of the reading and exposing action in the first reading region 5 are issued.

FIG. 4 shows the configuration of the linking piece 96 and the home position detecting elements S7, S8. The detecting elements S7, S8 shown in FIG. 4 are composed of, for example, photo interruptors, and while the linking piece 96 of the moving means 80 of the optical system 56 is intersecting with the detecting elements S7, S8 in FIG. 4, it means that the light at the photo interruptor is cut off by the linking piece 96, and this state is the ON state of the detecting elements S7, S8. FIG. 4 (1) shows the position of the linking piece 96 when the exposure means 4 is located at the first position 15a. When the copying apparatus 1 has stopped scanning or when waiting for input from the operation panel as mentioned below, the exposure means 4 is set at the first position 15a as explained above.

FIG. 4 (2) shows the relation of the linking piece 96 and the home position detecting elements S7, S8 when the exposure means 4 is located at the second position 15b. When the second exposure mode is selected and the RADF 7 is used, the exposure means 4 moves between the first position 15a and the second position 15b as mentioned above in synchronism with the conveyance of the document. To move for the exposure means 4 from the first position 15a to the second position 15b, first from the state in FIG. 4 (1), the first moving piece 81 containing the linking piece 96 starts to move in the direction of arrow A2 in FIG. 1. When the downstream end in the moving direction of the linking piece 96 passes the home position detecting element S8 and the detecting element S8 is changed over to ON state, a rotary encoder installed, for example, near the DC motor M8 in FIG. 3 starts to count pulses generated in synchronism with the rotation of the DC motor M8. After measuring a preset number of pulses N2, the DC motor M8 stops the rotation, and the linking piece 96 reaches the position indicated in FIG. 4 (2), so that the exposure means 4 is set in the second position 15b.

On the other hand, to return for the exposure means 4 from the second position 15b to the first position 15a, the exposure means 4 first begins to move in the direction of arrow A1 in FIG. 1 from the second position 15b. After the downstream end in the moving direction of the linking piece 96 changes over the home position detecting element S7 to ON state, the rotary encoder near the DC motor M8 starts to count pulses. When reaching a predetermined number of pulses N1, the DC motor M8 stops the rotation, and the linking piece 96 reaches the position shown in FIG. 4 (1), and the exposure means 4 is set in the first position 15a.

On the other hand, when the first exposure mode for copying the document fixed in the first reading region 5 is selected, simultaneously with start of the exposure action, the exposure means 4 begins to move in the direction of arrow A1 from the first position 15a. Afterwards, getting into the first reading region 5, after reading and exposing, the running direction is inverted in the fourth position 15d, and the exposure means 4 begins to run along the direction of arrow A2.

When finishing by copying only once the original image of the document put on the first transparent plate 9, the exposure means 4 coming in the direction of arrow A2 returns to the first position 15a. In the returning method to the first position 15a, the exposure means 4 returning from the right side in FIG. 1 passes through the first position 15a once, and then returns to the first position 15a from the left side of the first position 15a in the same procedure as returning from the second position 15b.

In other words, for example in FIG. 4, the linking piece 96 returning from the right side of the home position detecting element S7 is passed to the left side of the home position detecting element S7, and the running direction is inverted on the basis of the output of changing over the detecting element S8 to ON state by the downstream end in the moving direction of the linking piece 96. Later, as stated herein, it is returned to the first position 15a on the basis of the counting of the preset number of pulses N1 by the rotary encoder after changing over the detecting element S7 to ON state.

When copying plural times the original image of the document put on the first transparent plate 3, as mentioned tioned above, the exposure means 4 finishing the reading and exposing action in the first reading region 5 and about to return to the first position 15a is inverted in the running direction in the fifth position 15e, and the subsequent reading and exposing action is effected in the first reading region 5. FIG. 4 (3) is a diagram showing the relation of the linking piece 96 and the home position detecting elements S7, S8 when the exposure means 4 is located at the fifth position 15e, and FIG. 4 (4) is a diagram showing the relation between the linking piece 96 and the home position detecting elements S7, S8 when the exposure means 4 is located at the third position 15c. That is, the fifth position 15e is the point where the downstream end in the moving direction of the linking piece 96 changes over the home position detecting element S7 to ON state.

As shown in FIG. 4 (1), (3), (4), the fifth position 15e is closer to the first reading region 5 by the interval W with respect to the first position 15a. Therefore, when reading and exposing the same document plural times continuously, as compared with the conventional method of returning to the first position 15a every time after reading and exposing once, the time can be at least shortened by the portion of reciprocating the interval W in each reading and exposing action. Hence, the time required for copying plural times continuously can be outstandingly shortened.

When the reading and exposing action of plural times is over, the exposure means 4 returns to the first position 15a as mentioned above.

On the other hand, as shown in FIG. 1, the photosensitive drum 20 rotated and driven in the direction of arrow 100 is first electrically charged by a main corona discharger for charging 101. Next, as mentioned above, in the reading regions 5, 12, 14 in which the optical system 56 is moved by the moving means 80, the original image to be read is focused in a focusing region 102 on the photosensitive drum 20 through the optical system 56, and an electrostatic image corresponding to the original image is formed. The formed electrostatic image is made sensible into a toner image by a developing device 103.

The copying paper P for copying the toner image is fed from a cassette 104, and is conveyed into a conveying route 105. At the terminal end of the conveying route 105, a pair of resist rollers 106 and a copying paper detecting element S9 are disposed. When the copying paper P is conveyed into the conveying route 105, the downstream end in the conveying direction of the copying paper P is held by the resist rollers 106. The detecting element S9 is designed to confirm the presence of the copying paper P conveyed into the conveying route 105. Afterwards, when the timing of transferring the toner image formed on the photosensitive drum 20 onto the copying paper P is synchronized, the power of a motor which is not shown coupled with a clutch CLT3 which is not shown is transmitted to the resist rollers 106, and the conveyance of the copying paper P onto the photosensitive drum 20 is started. Synchronization of the timing is achieved, for example, on the basis of the output of the detecting element beneath the third position in the first exposure mode, or on the basis of the start of driving of the resist rollers 34, 52 in the RADF 7, for example, in the second exposure mode. The toner image formed on the photosensitive drum 20 is transferred on the copying paper P conveyed onto the photosensitive drum 20 by means of a corona discharger for transfer 107. The copying paper P after transfer is conveyed into a fixing device 109 through a conveying means 108 so as to be fixed.

Incidentally, the toner left over after transferring the toner image formed on the photosensitive drum 20 onto the copying paper P is peeled off from the photosensitive drum 20 and stored by a cleaning device 110. Later, light is emitted from a destatic device 111 onto the photosensitive drum 20, and the remaining electric charge on the photosensitive drum 20 is removed, and the photosensitive drum 20 is electrically charged for the electrostatic image to be formed subsequently.

When copying only on one side of the copying paper P, the copying paper P after fixing is discharged into a discharge tray 113 through a conveying route 112 to be stacked up. When copying on both sides of the copying paper P, the copying paper P after finishing copying on one side is once sent into a copying paper inverting means 114 without being conveyed into the conveying route 112.

The copying paper inverting means 114 comprises a first direction turning pawl 115, a second direction turning pawl 116, a pair of conveying rollers 117, and a pair of conveying rollers 118 rotatable both normally and reversely. Since the first direction turning pawl 115 is set at the position indicated by virtual line in FIG. 1, the copying paper P finishing copying action on one surface is sent into a conveying route 119. The copying paper P sent into the conveying route 119 is conveyed into a conveying route 120 by means of the conveying rollers 117, and furthermore, since the second direction turning pawl 116 is set at the position indicated by virtual line in FIG. 1, it is conveyed into a conveying route 121.

When the upstream end in the conveying direction of the copying paper P conveyed in the conveying route 120 passes a detecting element S10, after a preset time, the conveying rollers 118 are rotated and driven in the direction of returning the copying paper P to the conveying route 120. Furthermore, the second direction turning pawl 116 is changed over to the position indicated by solid line in FIG. 1, and the copying paper P conveyed from the conveying route 121 to a conveying route 122. The copying paper P conveyed into the conveying route 122 is discharged into an intermediate tray 124 by a discharge roller 123.

The copying paper P stored in the intermediate tray 124 is fed again, from the copying paper at the lowest position, by a paper feed roller 125, and is sent into conveying routes 126, 105. The copying paper P conveyed into the conveying route 105 is sent onto the photosensitive drum 20 by the resist rollers 106, and the copying action on the other surface not copied yet is effected. The copying paper P finishing duplex copy by this procedure is conveyed into the conveying route 112 as the first direction turning pawl 115 of the copying paper inverting means 114 is changed over to the position indicated by solid line in FIG. 1, and is then discharged into the discharge tray 113.

In FIG. 1, aside from the cassette 104, cassettes 127 to 129 are provided, and copying papers of different sizes are stored in them, respectively. The copying papers stored in the cassettes 104, 127 to 129 are selected and fed depending on the application, and conveyed into the conveying route 105, and subsequently the copying action is effected.

Furthermore, in FIG. 1, at some positions for detecting the conveying state of the copying paper P, there are conveying state detecting elements S11 (near the fixing device 109), S12 (near the inlet of the copying paper inverting means 114), S13 (near the exit to the discharge tray 113), S14 (near the discharge roller 123 to the intermediate tray), and S15 (near the exit of the intermediate tray 124), by using, for example, optical detecting elements or the life.

Figure 5:
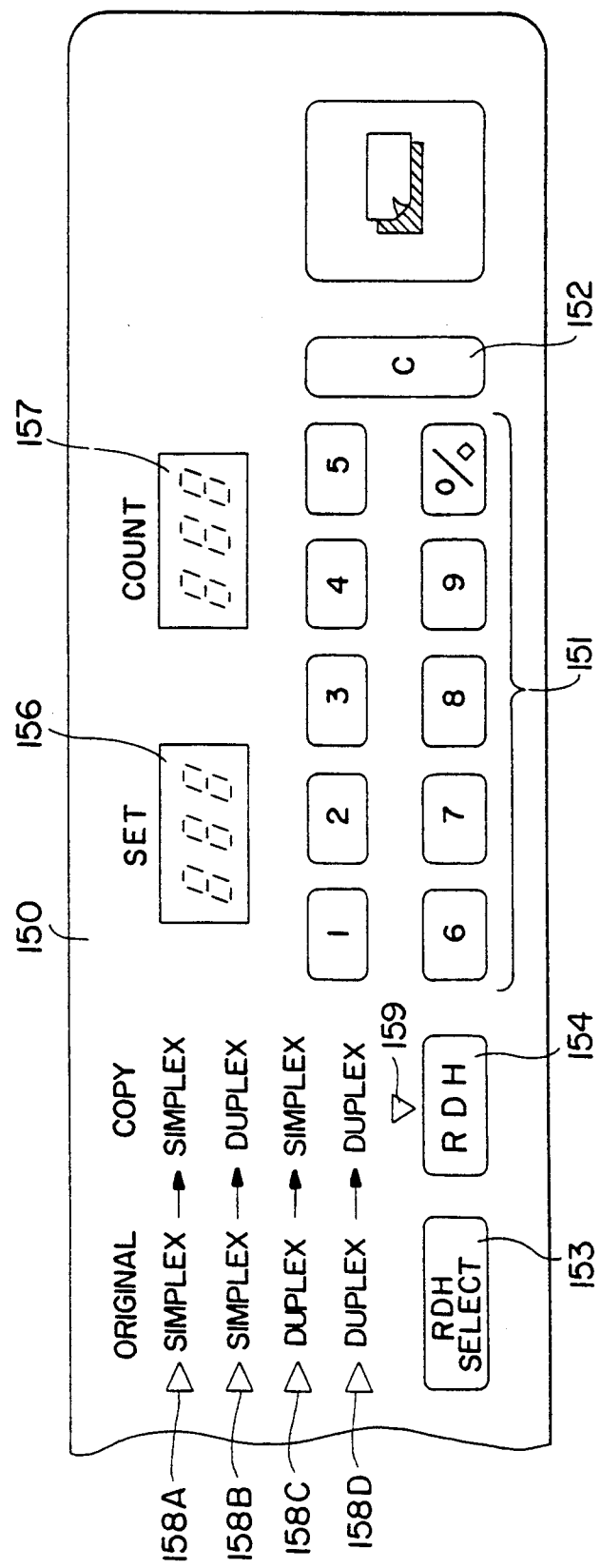
FIG. 5 is a partial plane view of a part of an operation panel 150 disposed on the main body 2.

FIG. 5 is a partial plane view of the operation panel 150 disposed in the main body 2. The operation panel 150 comprises numeric keys 151 for setting the number of copies, a clear key 152, a copy mode selection key 153 for setting the copying condition, a RADF (recirculating automatic document feeder) function key 154 for activating/inactivating the RADF 7, a copy start switch 155 for instructing start of copying action, a setting number display unit 156 for displaying the number of setting set by the numeric keys 151, a copying number display unit 157 for displaying the number of copies, a copy mode display units 158A to 158D for showing the copy mode selected by the copy mode selection key 153, and a RADF function mode display unit 159. The copy mode display units 158A to 158D and the RADF function mode display unit 159 are realized, for example, by containing light emitting diodes or the like, and when each mode is selected, the corresponding light emitting diode is driven to be lit up.

The copy mode display units 158A to 158D denote four copy modes, that is, the mode of taking one-sided copy from one-sided original (simplex to simplex), the mode of taking both-sided copy from one-sided original (simplex to duplex), the mode of taking one-sided copy from both-sided original (duplex to simplex) and the mode of taking both-sided copy from both-sided original (duplex to duplex), respectively, and every time the copy mode selection key 153 is pressed once, the copy mode is sequentially selected from the top, and the light emitting diode (not shown) of the corresponding one of the display units 158A to 188D is lit up. However, while the copy mode display unit 158D is lit, when the copy mode selection key 153 is pressed, the copy mode is changed to "simplex to simplex" as indicated by the copy mode display unit 158A.

The RADF 7 is activated when the RADF function mode key 154 is pressed and the RADF function mode display unit 159 is lit up, and when it is put out, it is inactivated. That is, when the operator puts the documents such as a book on the original platen (the first transparent plate 3) in order to obtain the copy images on the copying paper P, first the RADF function key 154 is operated to put out the RADF function mode display unit 159. To copy by conveying the documents D by using the RADF 7, the RADF function mode display unit 159 must be lit up.

When the RADF function is employed, the operator sets the copy mode in the procedure mentioned above by the operation of the copy mode function key 153. Then, using the numeric keys 151, the required number of copies is set. At this time, the set number of copies is shown in the setting number display unit 156. In succession to the operation of the numeric keys 151, when the copy start switch 155 is pressed, the RADF 7 and the main body 2 cooperate to start copying action. At this time, the number of copies being made is sequentially shown in the copy number display unit 157. In this way, as the operation continues until the set number shown in the setting number display unit 156 and the copy number shown in the copy number display unit 157 coincide, the operation of the copying apparatus 1 is stopped, and the display of the setting number display unit 156 is set to zero. At this time, the display in the copy number display unit 157 is held on, without being reset, until the copy start switch 155 is operated next time.

Figure 6:
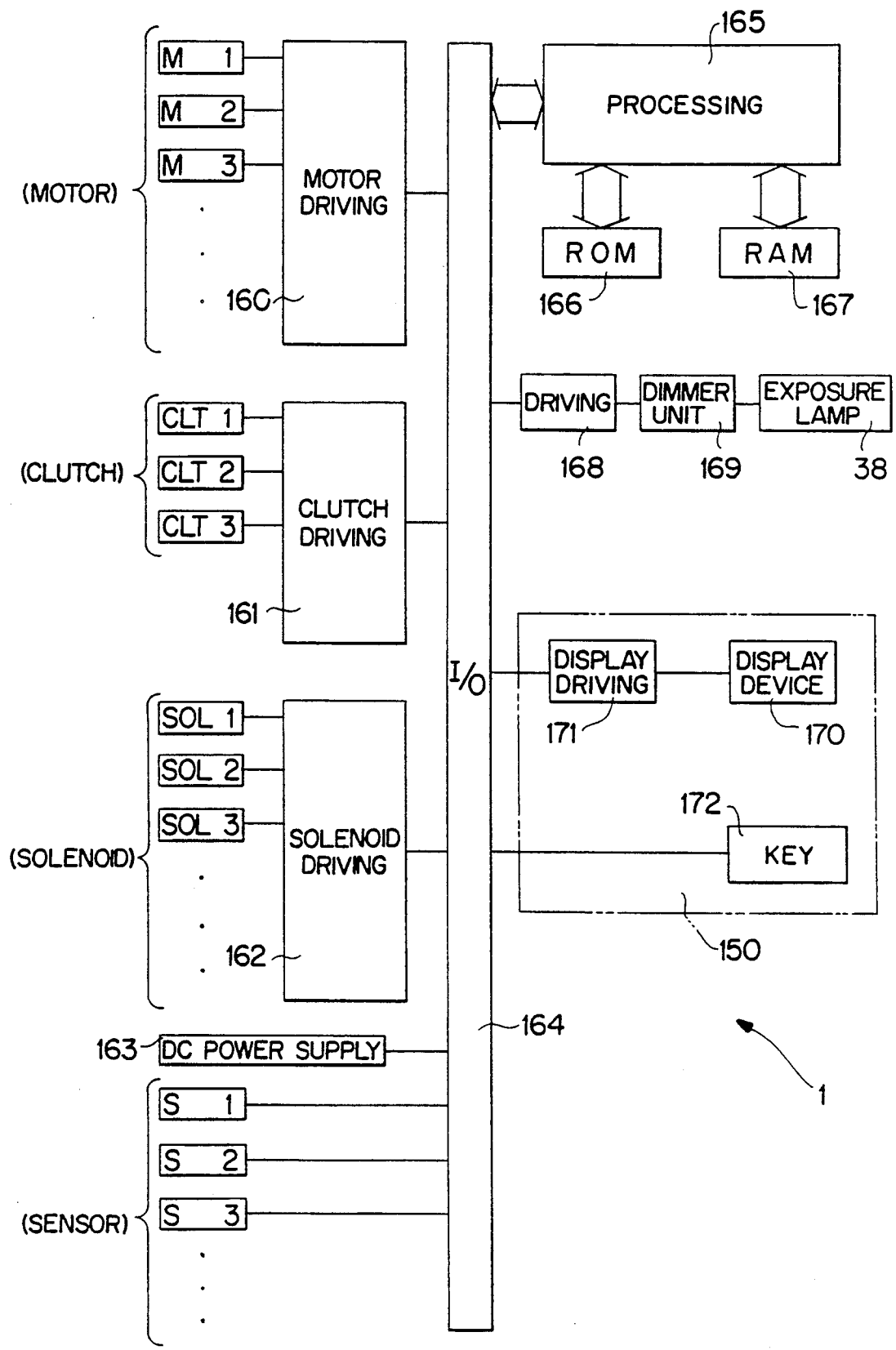
FIG. 6 is a block diagram showing an electrical composition of the copying apparatus 1.

FIG. 6 is a block diagram showing an electrical composition of the copier 1. The plural motors M1, M2 or the like are connected to a motor driving circuit 160, and the clutches CLT1 to CLT3 are connected to a clutch driving circuit 161, and plural solenoids SOL1, SOL2 or the like are connected to a solenoid driving circuit 162. The control elements used in the document conveying control of these driving circuits 160 to 162 and a DC power supply 163, copying paper conveying control, and copying process control are connected to an interface circuit (I/O) 164. To this interface circuit 164, the plural detecting elements S1, S2 and others are connected, and also a processing circuit 165 composed of microcomputer (CPU) is connected. The signals from the detecting elements are fed to the processing circuit 165, and arithmetic processing corresponding to the signals is effected in the processing circuit 165, and drive control signals are given to the driving circuits 160 to 162 through the interface circuit 164.

In the processing circuit 165, a ROM (read only memory) 166 and a RAM (random access memory) 167 are connected. The processing circuit 165 performs control action according to the control program stored in the ROM 166, using the storage area of the RAM 167 as the working region.

The interface circuit 164 is connected to a dimmer unit 169 for energizing the exposure lamp 38 of the exposure means 4 through a driving circuit 168, and feeds display control signals to display units 170 (including the display units 156, 157, 158A to 158D, 159) of the operation panel through a display driving circuit 171, and is connected to operation keys 172 (including the keys 151 to 155).

Figure 7:
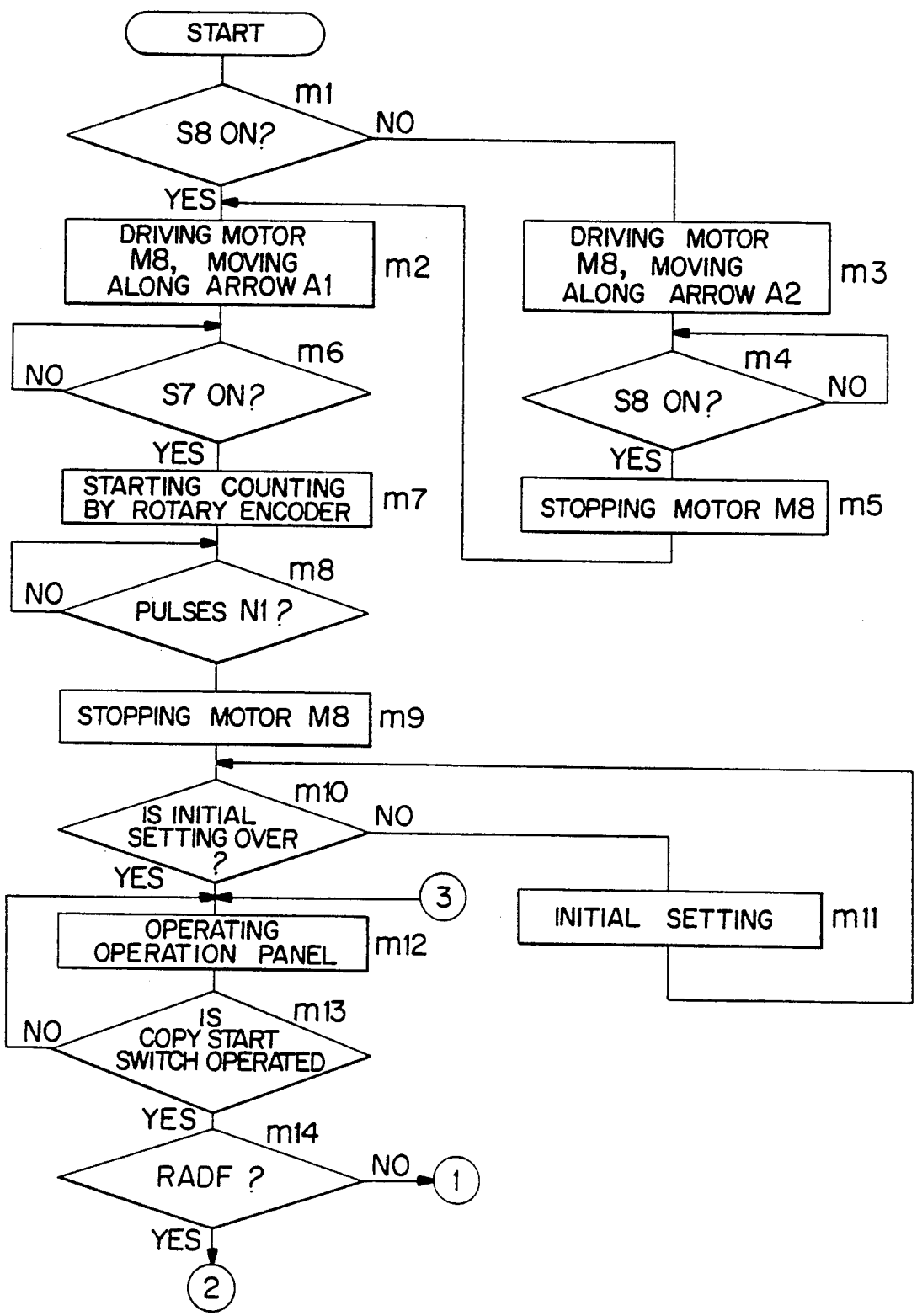
FIG. 7 is a flow chart for explaining the control of copying action of the copying apparatus 1.
Figure 7:
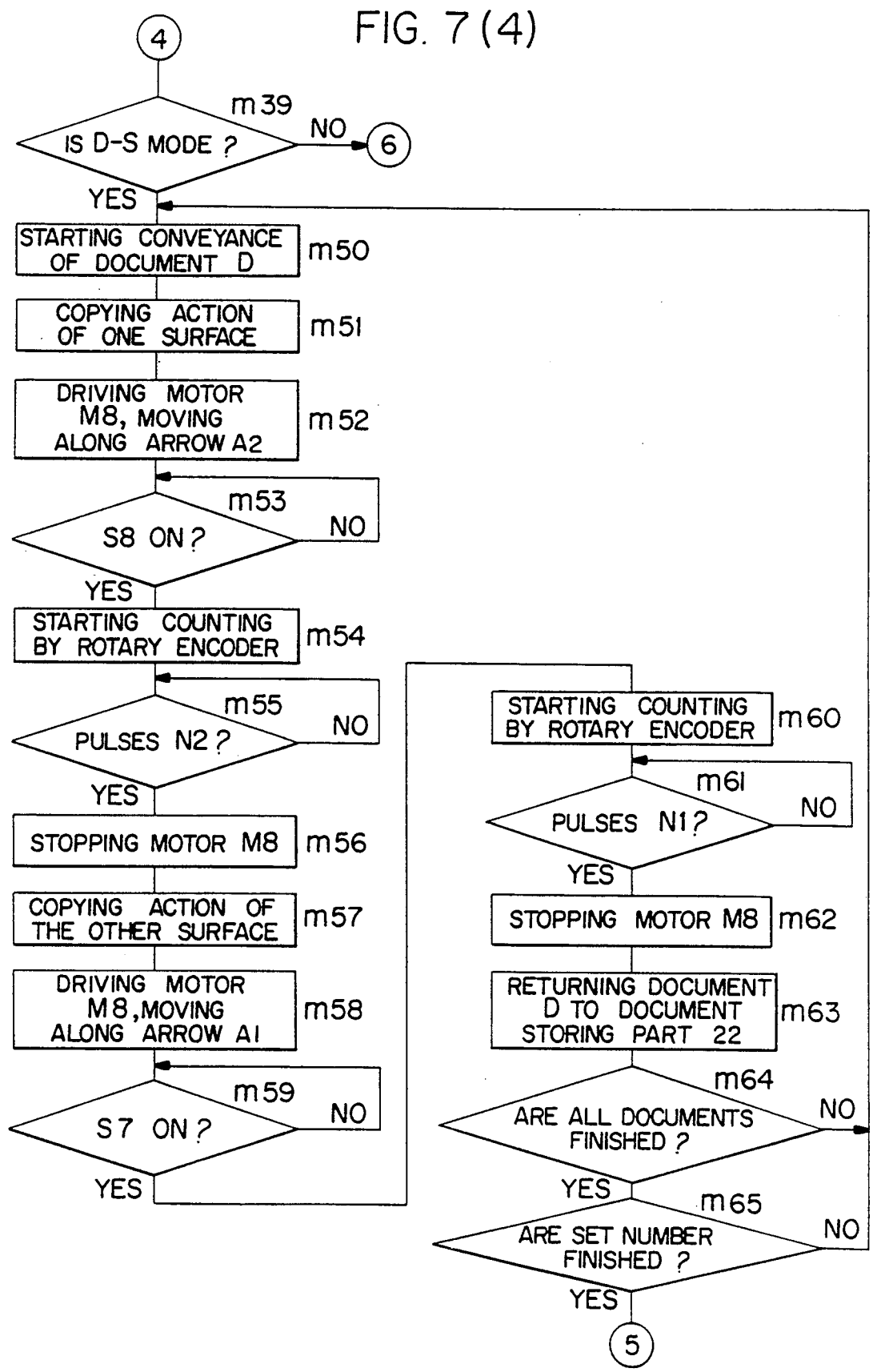
Figure 7:
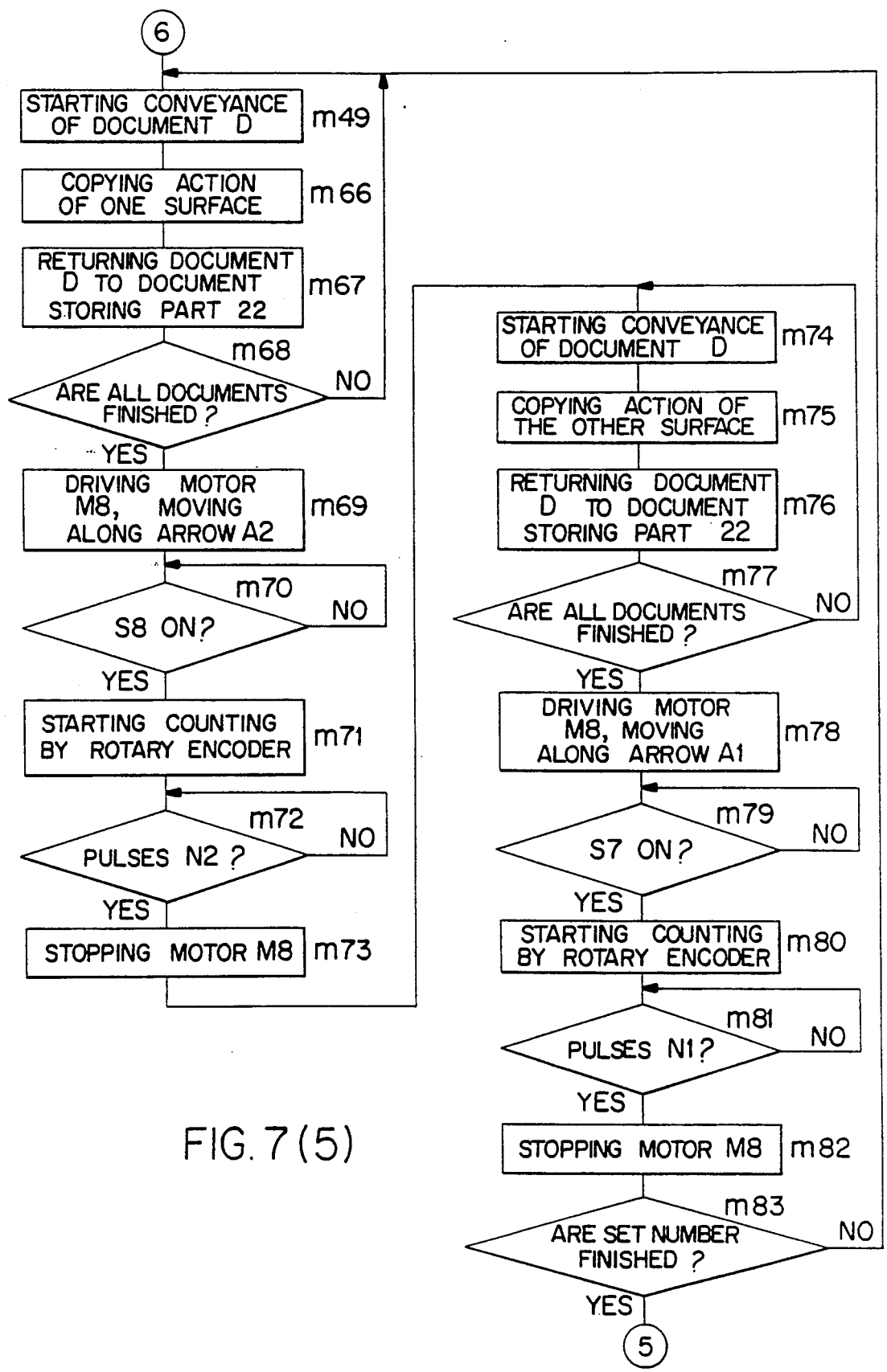

FIG. 7 is a flow chart for explaining the control of the copying action of the copying apparatus 1. Referring to FIG. 7, the document conveying state and copying paper conveying state are explained together with the movement of the exposure means 4 in each copy mode. The program of FIG. 7 (1) is started, for example, when the power of the copying apparatus 1 is turned on.

When the program is started, in the first place, the exposure means 4 is set in the first position 15a. That is, when the copying apparatus 1 is in the input waiting state, the exposure means 4 is set so as to wait at the first position 15a. Therefore, if the exposure means 4 is moved to other position by power failure or vibration during copying action, the initial processing is intended to set in the first position 15a securely. At a step m1, it is judged whether the home position detecting element S8 provided at the second position 15b is in ON state or not. When the detecting element S8 is in ON state, the processing proceeds from the step m1 to a step m2. When the detecting element S8 is in OFF state, the processing proceeds from the step m1 to a step m3. At the step m3, the motor M8 is driven, and the exposure means 4 is moved in the direction of arrow A2, and the processing proceeds to a step m4.

At the step m4, the linking piece 96 provided at the side of the first moving piece 81 (see FIG. 3) supporting the exposure means 4 comes to the detecting element S8, and it is judged whether the detecting element S8 is changed over to ON state or not. When not changed yet, the processing is repeated at the step m4, and when the detecting element S8 is changed over to ON state, the processing proceeds from the step m4 to a step m5.

At the step m5, the rotation of the motor M8 is stopped, and the processing proceeds to the step m2.

At the step m2, the motor M8 is driven, and the exposure means 4 is moved in the direction of arrow A1, and the processing proceeds from the step m2 to a step m6. At the step m6, as the linking piece 96 comes to the home position detecting element S7 provided at the lower part of the first reading region, it is judged whether the detecting element S7 is changed over to ON state or not. When the detecting element S7 is not changed over, the processing is repeated at the step m6, and when changed over to ON state, the processing proceeds from the step m6 to a step m7.

At the step m7, from the moment of changeover of the detecting element S7 to ON state, the rotary encoder provided near the motor M8 starts counting the pulses generated in synchronism with the motor M8, and the processing proceeds to a step m8. At the step m8, it is judged whether the pulse number counted by the rotary encoder has reached the preset number of pulses N1 or not. When not reaching the preset number N1, the processing is repeated at the step m8, and when the counting reaches N1, the processing proceeds to a step m9, and the motor M8 stops the rotation, thereby stopping the move of the exposure means 4. In this state, the exposure means 4 is set in the first position 15a.

When setting of the exposure means 4 in the first position 15a is over, the processing proceeds to a step m10, and it is judged whether the initial setting for copying action is over or not. The initial setting includes the initial setting of temperature of the fixing device 109 and the copying process unit around the photosensitive drum 20. When the initial setting is not over yet, the processing moves from the step m10 to a step m11. At the step m11, the initial setting is effected, and the processing goes back from the step m11 to the step m10, and the same judgement is made. When the initial setting is judged to be over at the step m10, the processing proceeds from the step m10 to a step m12.

At the step m12, the operator operates the keys on the operation panel 150 for making an input, and the setting or change of the number of copies and the copy mode is effected. After this key operation, the processing proceeds from the step m12 to a step m13, and it is judged whether the copy start switch is pressed or not. When not operated, the processing returns from the step m13 to the step m12, and the same judgement is repeated. When the operation of the copy start switch is judged at the step m13, the processing proceeds from the step m13 to a step m14.

At the step m14, it is judged whether the copying action by using the RADF function, that is, the second exposure mode for copying by using the RADF 7 is set or not. When the RADF function is employed, the processing proceeds from the step m14 to a step m15 shown in FIG. 7 (3), which is described later. On the other hand, when not using the RADF function, that is, when he first exposure mode of copying by putting the document on the first transparent plate 3 as the original platen is selected, the processing proceeds from the step m14 to a step m16 in FIG. 7 (2).

Thereafter, in the first exposure mode, the copying action on the document put on the original platen is started. At the step m16, the motor M8 is driven for the exposure means 4 waiting at the first position 15a, and it is moved in the direction of arrow A1, and at a step m17, the reading and exposing action in the first reading region 5 is effected, and the copying action on the copying paper P is carried out in the copying apparatus 1, and then the processing proceeds to a step m18.

At the step m18, it is judged whether the move of the exposure means 4 in the direction of arrow A1 is finished or not. When the exposure means 4 has not reached the fourth position 15d and it is judged that the scanning is not over, the processing is repeated at the step m18, and when judged to have reached the fourth position 15d, the processing proceeds to a step m19. At the step m19, the motor M8 is stopped, and the move of the exposure means 4 is stopped, and the driving of the motor M8 is started again at a step m20, and the move of the exposure means 4 in the direction of arrow A2 is started, and the processing proceeds to a step m21. Meanwhile, the copying paper P finishing the copying action is discharged, for example, into the discharge tray 113.

At the step m21, as the linking piece 96 comes to the home position detecting element S7, it is judged whether the detecting element S7 is changed over to ON state or not. When not changed over, the processing is repeated at the step 21, and when judged to be changed to ON state, the processing proceeds to a step m22. At the step m22, it is judged whether the copying of the set number of same copies of the document put on the first transparent plate 3 as the original platen is finished or not. When not finished, the processing proceeds from the step m22 to a step m23. At the step m23, the rotation of the motor M8 is stopped, and the exposure means 4 is stopped at the fifth position 15e, and the processing returns to the step m16. Thereafter, by the number of set copies, the processing from the step m16 to the step m23 is repeated, and when the copying action for the preset number of copies is over, the processing proceeds from the step m22 to a step m24.

At the step m24, the exposure means 4 finishing the copying action in the first exposure mode starts the processing necessary for returning to the first position 15a. That is, the exposure means 4 once passes through the first position 15a, and is set to the first position from the left side in FIG. 1. At the step m24, it is judged whether the home position detecting element S8 is changed over to ON state by the linking piece 96 or not. When not changed over yet, the processing is repeated at the step m24, and when changed to ON state, the processing proceeds to a step m25, and the rotation of the motor M8 is stopped.

Thereafter, the processing goes to step m26, and the motor M8 is driven again to start moving the exposure means 4 in the direction of arrow A1, and the processing proceeds to a step m27. At the step m27, it is judged whether the home position detecting element S7 is changed over to ON state by the linking piece 96 or not. When not changed over, the processing is repeated at the step m27, and when changed to ON state, the processing proceeds to a step m28, and the rotary encoder provided near the motor M8 starts counting the preset number of pulses N1, and the processing proceeds to a step m29.

At the step m29, it is judged whether the measured pulse number has reached the preset number N1 or not. When not reaching N1 yet, the processing is repeated at the step m29, and when reaching N1, the processing proceeds to a step m30, and the driving of the motor M8 is stopped, and the copying apparatus 1 is stopped at a step m31. Afterwards, the processing returns to the step m12, thereby waiting for the key input on the operation panel 150 by the operator as mentioned above.

On the other hand, when the second exposure mode of using the RADF 7 is selected at the step m14, at the step m15 advancing from the step m14, it is judged whether the simplex to simplex mode is selected or not. When the simplex to simplex mode is not selected, the processing proceeds to a step m32 as mentioned below, and when this mode is selected, the operation proceeds from the step m15 to a step m33.

In the simplex to simplex mode, the exposure means 4 is fixed at the first position 15a, and is not moved at all. At the step m33, it is started to convey the document D stacked up and stored in the document storing part 22 in the RADF 7, and at a step m34, the reading and exposing action in the second reading region 12 is effected, and the copying action to copy onto the copying paper P is effected in the copying apparatus 1. The document D whereof one surface has been read in the second reading region 12 is merely conveyed in the third reading region 14. On the other hand, the copying paper P finishing the copying action on one surface is discharged into the discharge tray 113.

Afterwards, proceeding to a step m35, the document D finishing the copying action is restored at the lowermost portion of the documents stacked up in the document storing part 22, and the processing proceeds to a step m36. At the step m36, it is judged whether the copying action of all documents stacked up and stored in the document storing part 22 is finished or not. When not finished yet, the processing returns from the step m36 to the step m33, and the processing of the steps m33 to m36 is repeated. When copying action of all documents D is finished, the processing proceeds from the step m36 to a step m37.

At the step m37, it is judged of the copying action for the preset number of copies is finished on all documents D stored in the document storing part 22. When not reaching the preset number, the processing returns from the step m37 to the step m33, and the processing of the steps m33 to m37 is repeated. When the copying action for the preset number of copies is judged to be finished, the processing proceeds from the step m37 to a step m38, and the copying apparatus 1 is stopped, and the processing goes back to the step m12, thereby waiting for key input of the operator.

When the mode selected at the step m15 is judged to not be simplex to simplex mode and proceeds to the step m32, it is judged whether the selected copy mode is simplex to duplex mode or not. When the selected copy mode is not judged to be simplex to duplex mode, the processing proceeds from the step m32 to a step m39 in FIG. 7 (4). When this mode is judged, the processing proceeds to a step m40.

In the consequent simplex to duplex mode, the exposure means 4 is fixed at the first position 15a and is not moved at all. First, at the step m40, it is started to convey the document D stacked up and stored in the document storing part 22 into the reading regions 12, 14, and at a step m41, the reading and exposing action is effected in the second reading region only on the odd-numbered documents from the uppermost portion of the documents stacked up in the document storing part 22, and the copying action on the copying paper P is effected in the copying apparatus 1. The document D conveyed through the reading regions 12, 14 is inserted into the lowermost portion of the documents D stacked up in the document storing part 22 at a step m42, and then the processing proceeds to a step m43.

At the step m43, it is judged whether the conveying into the reading regions 12, 14 is finished on all documents stacked up and stored in the document storing part 22 or not. When not finished, the processing returns from the step m43 to the step m40, and the processing of the steps m40 to m43 is repeated. In the processing of the steps m40 to m43, meanwhile, the reading and exposing action is done only on the odd-numbered documents from the uppermost portion of the documents stacked up and stored in the document storing part 22, while the even-numbered documents are merely conveyed through the conveying route without being subjected to the reading and exposing action. Besides, the copying paper P finishing the copying action on one surface is sequentially stored in the intermediate tray 124 by way of the copying paper inverting means 114.

At the step m43, when it is judged that conveying of all documents D is over, the processing proceeds to a step m44, and it is started again to convey the documents stacked up and stored in the document storing part 22 from the uppermost portion into the reading regions 12, 14. At a step m45, the reading and exposing action is done in the second reading region only on the even-numbered documents from the uppermost portion of the documents D stacked up and stored in the document storing part 22, and the copying action is effected on the other surface of the copying paper fed from the lowermost portion of the copying papers P being already stored in the intermediate tray 124 after finishing copying on one surface. Then, at a step m46, the document finishing the conveyance is restored into the lowermost portion of the documents D stacked up in the document storing part 22, and the processing proceeds to a step m47. Meanwhile, the copying paper P finishing the copying action on both sides is discharged into the discharge tray 113.

At the step m47, it is judged whether the conveying into the reading portions 12, 14 is finished on all documents stored in the document storing part 22. When not finished yet, the processing returns from the step m47 to the step m44, and thereafter the processing of the steps m44 to m47 is repeated. Meanwhile, in the processing of the steps m44 to m47, the reading and exposing action is effected only on the even-numbered documents from the uppermost portion of the documents stacked up and stored in the document storing part 22, while the odd-numbered documents are merely conveyed through the conveying route without being subjected to the reading and exposing action. When the conveying of all documents is judged to be over, the processing proceeds from the step m47 to a step m48.

At the step m48, it is judged whether the copying action for the preset number of copies is done on all documents stored in the document storing part 22. When the copying action for the preset number of sets is not finished, the processing goes back from the step m48 to the step m40, and the processing of the steps m40 to m48 is repeated. Thereafter, when the copying action for the preset number of sets is judged to be finished, the processing returns from the step m48 to the step m38, and the copying apparatus 1 is set in stopped state, thereby waiting for key input by the operator at the step m12.

On the other hand, at the step m32, when the selected copy mode is judged to not be the simplex to duplex mode, and, after being promoted to the step m39, the selected mode is judged to be duplex to simplex mode or not. When the selected copy mode is judged to not be the duplex to simplex mode, the processing proceeds from the step m39 to a step m49 in FIG. 7 (5).

When this mode is judged at the step m38, the processing proceeds to a step m50, and it is started to convey the document from the uppermost portion of the documents D stacked up and stored in the document storing part 22, and the processing proceeds to a step m51. At the step m51, by the exposure means 4 preliminarily set in the first position, 15a, one surface of the document conveyed to the first reading portion 12 is read and exposed, and the copying action on one surface of the copying paper P is effected in the copying apparatus 1. The copying paper P finishing the copying action of one surface of the document on its one surface is discharged into the discharge tray 113.

Later, the processing proceeds to a step m52, and when the reading and exposing action is over in the first reading portion 12, the motor M8 for moving the optical system 56 is driven to start moving the exposure means 4 in the direction of arrow A2, and the processing proceeds to a step m53. At the step m53, the linking piece 96 provided at the side of the first moving piece 81 for supporting the exposure means 4 comes to the home position detecting element S8 provided beneath the second reading portion 14, and it is judged whether the detecting element S8 is changed over to ON state or not. When not changed over yet, the processing is repeated at the step m53, and when the detecting element S8 is changed over to ON state, the processing proceeds to a step m54, and the rotary encoder provided near the motor M8 starts to count the pulses generated in synchronism with the rotation of the motor M8, thereby proceeding to a step m55.

At the step m55, it is judged whether the pulse counting has reached the preset number of pulses N2. When not reaching yet, the processing is repeated at the step m55, and when reaching the preset number of pulses N2, the processing proceeds to a step m56, and the rotation of the motor M8 is stopped, and the setting of the exposure means 4 in the second position 15b is finished.

Afterwards, at a step m57, the other surface of the document D conveyed into the second reading portion 14 is read and exposed, and the copying action on the copying paper P is effected in the copying apparatus 1. The copying paper P finishing the copying action of the other surface of the document on its one surface is discharged into the discharge tray 113.

When the reading and exposing action in the second reading portion 14 is over, the processing proceeds to a step m58. The motor M8 is driven to start moving the exposure means 4 in the direction of arrow A1, and the processing proceeds to a step m59. At the m59, as the linking piece 96 comes to the home position detecting element S7 provided beneath the first reading portion 12, it is judged whether the detecting element S7 is changed over to ON state or not. When not changed over yet, the processing is repeated at the step m59, and when the detecting element S7 is changed to ON state, the processing proceeds to a step m60, and the rotary encoder starts counting the pulses generated in synchronism with the rotation of the motor M8, and the processing proceeds to a step m61.

At the step m61, it is judged whether the pulse counting has reached the preset number of pulses N1 or not. When not reaching yet, the processing is repeated at the step m61, and when reaching the preset number N1, the processing proceeds to a step m62, and the rotation of the motor M8 is stopped, and the returning of the exposure means 4 to the first position 15a is finished.

Afterwards, at a step m63, the document whereof both the surfaces have been read is stored in the document storing part 22, and the processing proceeds to step m64. At the step m64, it is judged whether the conveying is finished on all documents stacked up and stored in the document storing part 22 or not. When not finished yet on all documents, the processing returns from the step m64 to the step m50, and the processing of the steps m50 to m64 is repeated. When conveying of all documents is judged to be finished, the processing proceeds to a step m65.

At the step m65, it is judged whether the copying action is finished for the preset number of sets on all documents stacked up and stored in the document storing part 22 or not. When the copying action for the preset number of sets is not finished yet, the processing returns from the step m65 to the step m50, and thereafter the processing of the steps m50 to m65 is repeated. Afterwards, when it is judged that the copying action for the preset number of sets is finished, the processing goes to step m38, and the copying apparatus 1 is set in stopped state, thereby waiting for the key input by the operator at the step m12.

On the other hand, when the selected copy mode is judged to not be duplex to simplex mode at the step m39, the processing proceeds to the step m49, and the duplex to duplex mode is controlled thereafter. At the step m49, it is started to convey into the conveying route sequentially from the uppermost portion of the documents stacked up and stored in the document storing part 22, and the processing proceeds to a step m66.

Since the exposure means 4 is set at the first position 15a, at the step m66, the reading and exposing action is effected on one surface of the document conveyed into the second reading region 12, and the copying action to copy on one surface of the copying paper P is carried out in the copying apparatus 1. The document whereof one surface has been read is merely conveyed in the second reading portion 14 without being read, and at a step m67 is restored in the lowermost portion of the documents D stacked up in the document storing part 22, thereby proceeding to a step m68. Meanwhile, the copying paper P finishing the copying of one surface of the document on its one surface is sequentially stored in the intermediate tray 124 by way of the copying paper inverting means 114.

At the step m68, it is judged whether the copying action of one surface is finished on all documents stacked up and stored in the document storing part 22 or not. When not finished yet, the processing returns from the step m68 to the step m49, and the processing of the step m49, and the steps 66 to m68 is repeated. When the copying action of one surface is finished on all documents, the processing proceeds to a step m69.

At the step m69, the motor M8 is driven, and it is started to move the exposure means 4 in the direction of arrow A2, thereby proceeding to a step m70. At the step m70, as the linking piece 96 comes to the home position detecting element S8, it is judged whether the detecting element S8 is changed over to ON state or not. When not changed over, the processing is repeated at the step m70, and when the detecting element S8 is changed over to ON state, the processing proceeds to a step m71, and the rotary encoder starts counting the preset number of pulses, and the processing proceeds to a step m72.

At the step m72, it is judged whether the pulse counting has reached the preset number of pulses N2 or not. When not reaching yet, the processing is repeated at the step m72, and when reaching the preset number N2, the processing proceeds to a step m73, and the motor M8 is stopped, and the setting of the exposure means 4 in the second position 15b is finished.

In the subsequent processing, at a step m74, it is started again to convey the document stacked up in the document storing part 22 from the uppermost portion into the conveying route, thereby proceeding to a step m75. At the step m75, the conveyed document D is not read in the first reading portion 12 and is merely conveyed, and the other surface of the document is read and exposed in the second reading portion 14, and the copying action is effected in the copying apparatus 1 on the other surface of the copying paper P being fed from the lowermost portion of the copying papers stacked and stored in the intermediate tray 124. The read document is restored in the lowermost portion of the documents stacked up in the document storing part 22 at a step m76, and the processing proceeds to a step m77. The copying paper P finishing the copying action on both surfaces is discharged into the discharge tray 113.

At the step m77, it is judged whether the copying action on the other surface is finished on all documents stacked up in the document storing part 22 or not. When not finished yet, the processing returns from the step m77 to the step m74, and the processing of the steps m74 to m77 is repeated. When it is judged that the copying action on all documents is finished, the processing proceeds from the step m77 to a step m78, and the motor M8 is driven to start moving the exposure means 4 in the direction of arrow A1, and the processing proceeds to a step m79.

At the step m79, as the linking piece 96 comes to the home position detecting element S7, it is judged whether the detecting element S7 is changed over to ON state or not. When not changed over, the processing is repeated at the step m79, and when the detecting element S7 is changed over to ON state, the processing proceeds to a step m80, and the rotary encoder starts counting the pulses, and the processing proceeds to a step m81.

At the step m81, it is judged whether the pulse counting has reached the preset number of pulses N1 or not. When not reaching, the processing is repeated at the step m81, and when reaching the preset number N1, the processing proceeds to a step m82, and the motor M8 is stopped, and the setting of the exposure means 4 in the first position 15a is over, and the processing proceeds to a step m83.

At the step m83, it is judged whether the copying action is finished for the preset number of sets on all documents stacked up and stored in the document storing part 22 or not. When not finished yet, the processing returns from the step m83 to the step m49, and thereafter the processing of the step m49 and the steps m66 to m83 is repeated. When it is later judged that the copying action for the preset number of sets is over, the processing returns from the step m83 to the step m38, and the copying apparatus 1 is set in the stopped state, thereby waiting for key input by the operator at the step m12. Thereafter, the same processing is sequentially repeated.

Thus, according to the foregoing embodiment, when making same copies plural times in the first exposure mode by putting the document on the first transparent plate as the original platen, and reading and exposing by running the exposure means, the running distance of the exposure means for one time of the reading and exposing action can be shortened, and therefore the time required for copying action, especially the reading and exposing action can be outstandingly shortened as compared with the prior art. Besides, since the running distance of the moving means for supporting the exposure means may be decreased, and hence the consumption of the motor and others for moving the moving means can be reduced, and hence the service life of the copying apparatus can be extended.

In the foregoing embodiment, when setting the exposure means in the first position 15a, it is designed to set from the left side of the first position 15a, always in FIG. 1 by using the home position detecting elements S7, S8, and the rotary encoder. In other embodiment, however, when the exposure means is coming from the right side of the first position 15a, it may be also designed to count the preset number of pulses N3 by the rotary encoder after the linking piece comes to the home position detecting element S7, and to set the exposure means in the first position 15a.

Meanwhile, the embodiment refers to the structure for forming the electrostatic image on the photosensitive drum, but the invention is similarly applied to the copying apparatus designed to expose on a photosensitive recording paper.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A copying apparatus comprising:
   a transparent plate on which a document to be copied is placed, for forming a first reading region,
   a document feeding means, which is disposed adjacently to the transparent plate deviated in the horizontal direction, for moving the document to a predetermined second reading region,
   an optical reading means for running reciprocally in the first reading region, stopping at a predetermined stopping position in the second reading region, and possessing a moving portion for moving so as to read the document optically,
   a driving means for moving the moving portion, which stops and holds at the stopping position when reading in the second reading region, moves from the stopping position when reading in the first reading region, reciprocates in the first reading region when reading once in the first reading region and returns to the stopping position after scanning, reciprocates in the first reading region when reading plural times in the first reading region and, after scanning, moves to a turning position for continuous copying predetermined between the first reading region and the stopping position, and repeatedly reciprocates in the first reading region from the turning position for continuous copying, and returns to the stopping position after reading plural times, and a copying means for copying the original image on a copying paper in response to the output from the optical reading means.

2. A copying apparatus as claimed in claim 1, wherein the turning position for continuous copying is detected by an optical detecting means comprising a light emitting element and a light receiving element, and the driving means moves the moving portion in response to the output from the optical detecting means.

3. A copying apparatus as claimed in claim 1, wherein the moving portion comprises a light source for emitting light to the document, and a distance from the turning position for continuous copying to the first reading region is set corresponding to time necessary for the quantity of light of the electrically energized light source to rise up from the turning position for continuous copying.

4. A copying apparatus as claimed in claim 1, wherein the distance from the turning position for continuous copying to the first reading region is set corresponding to time necessary for rising up to a running speed in the first reading region of the moving portion from the turning position for continuous copying.

5. A copying apparatus comprising:

a transparent plate on which a document to be copied is placed, for forming a first reading region, a document feeding means, which is disposed adjacently to the transparent plate deviated in the horizontal direction, for moving the document to a predetermined second reading region, an optical reading means for running reciprocally in the first reading region, stopping at a predetermined stopping position in the second reading region, and possessing a moving portion so as to read the document optically, a driving means for moving the moving portion which moves to a predetermined running start position between the stopping position and the first reading region from the stopping position when running in the first reading region, scans reciprocally in the first reading region from the running start position depending on the number of times of copying, and returns to the stopping position after finishing copying, and a copying means for copying the original image on a copying paper in response to the output from the optical reading means.

6. A copying apparatus as claimed in claim 1 or 5, wherein the second reading region is formed as a pair of portions each portion spaced from the other in the horizontal direction, the document feeding means runs the document so that the one surface faces one second reading portion and the other surface faces the other second reading portion, and the driving means stops the moving portion at the stopping position opposite to the one second reading region when scanning the one surface of the document by the document feeding means, and moves and stops the moving portion at other stopping position opposite to the other second reading portion when scanning the other surface of the document.

7. A copying apparatus for reading an original image by scanning optically, wherein a first reading region where the document is fixed, and the original image is read by scanning with an exposure means for reading optically, and a second reading region where the exposure means is fixed, and the document to be read is scanned by running are determined, a fixing position of the exposure means corresponding to the second reading region is selected at a scanning start position of the exposure means to the first reading region, and a scanning end position finishing the scanning in the first reading region by the exposure means is selected somewhere between the scanning start position of the exposure means and the first reading region.

* * * * *